US008947469B2

(12) United States Patent
Tanaka et al.

(10) Patent No.: US 8,947,469 B2
(45) Date of Patent: Feb. 3, 2015

(54) DISPLAY DEVICE AND DISPLAY CONTROL DEVICE

(75) Inventors: Shogo Tanaka, Kobe (JP); Shinya Tanaka, Kobe (JP); Satoshi Harumoto, Kobe (JP); Naotoshi Miyamoto, Kobe (JP); Minoru Maehata, Kobe (JP); Miki Ozawa, Kobe (JP); Tomofumi Mizuno, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 684 days.

(21) Appl. No.: 13/146,807

(22) PCT Filed: Jan. 18, 2010

(86) PCT No.: PCT/JP2010/050462
§ 371 (c)(1),
(2), (4) Date: Jul. 28, 2011

(87) PCT Pub. No.: WO2010/087239
PCT Pub. Date: Aug. 5, 2010

(65) Prior Publication Data
US 2012/0038685 A1 Feb. 16, 2012

(30) Foreign Application Priority Data
Jan. 30, 2009 (JP) ................. 2009-020868

(51) Int. Cl.
*G09G 5/10* (2006.01)
*G09G 5/00* (2006.01)
(Continued)

(52) U.S. Cl.
CPC ............ *G06F 3/1431* (2013.01); *G01C 21/265* (2013.01); *G01C 21/367* (2013.01); *G01C 21/3697* (2013.01); *G09G 3/20* (2013.01); *G09G 2330/04* (2013.01); *G09G 2330/08* (2013.01)
USPC .......................................... 345/690; 345/204

(58) Field of Classification Search
CPC .................. G09G 2320/0276; G09G 2360/16; G09G 2320/0626; G09G 3/3648; G09G 3/3611; G09G 3/3688; G09G 2330/021; G09G 2310/027; G09G 5/006
USPC .................................................. 345/690, 204
See application file for complete search history.

(56) References Cited

U.S. PATENT DOCUMENTS 6,429,845 B1 8/2002 Unseld et al.
2006/0139291 A1* 6/2006 Cho et al. ...................... 345/100
(Continued)

FOREIGN PATENT DOCUMENTS

JP A-07-199851 8/1995
JP A-11-500978 1/1999
(Continued)

OTHER PUBLICATIONS

Nov. 20, 2012 Office Action issued in Japanese Patent Application No. 2009-020868 (with partial translation).
(Continued)

*Primary Examiner* — Aneeta Yodichkas
(74) *Attorney, Agent, or Firm* — Oliff PLC

(57) ABSTRACT

A display device includes a display panel on which images are displayed and which includes a plurality of display regions; a plurality of driving units that display the images in the plurality of display regions; a displayable region detecting unit that detects a displayable region at a time of abnormality of the display panel; an abnormality-time display image generating unit that generates an abnormality-time display image according to the displayable region detected by the displayable region detecting unit; and an abnormality-time display control unit that displays the abnormality-time display image generated by the abnormality-time display image generating unit in a displayable region while causing a driving unit of the plurality of driving units of which a corresponding display region is the displayable region to display an image in the corresponding display region.

10 Claims, 24 Drawing Sheets

(51) Int. Cl.
*G06F 3/038* (2013.01)
*G06F 3/14* (2006.01)
*G01C 21/26* (2006.01)
*G01C 21/36* (2006.01)
*G09G 3/20* (2006.01)

(56) References Cited

U.S. PATENT DOCUMENTS

2008/0204391 A1* 8/2008 Yi .................................. 345/88
2009/0115592 A1* 5/2009 Miake et al. .................. 340/459
2010/0302214 A1* 12/2010 Kim et al. ..................... 345/204

FOREIGN PATENT DOCUMENTS

JP WO2007/037050 A1 4/2007
JP A-2008-306411 12/2008

OTHER PUBLICATIONS

Apr. 2, 2013 Office Action issued in Japanese Patent Application No. 2009-020868 (with translation).
Apr. 30, 2014 Office Action issued in Chinese Application No. 201080005834.1 (with translation).
International Search Report in International Application No. PCT/JP2010/050462; dated Apr. 6, 2010 (with English-language translation).

* cited by examiner

FIG. 17

| ELEMENT IMAGE TYPE | PRIORITY | DISPLAY TIME [SECOND] |
|---|---|---|
| TRAVELING SPEED | 1 | 10 |
| ROTATIONAL SPEED OF ENGINE | 2 | 8 |
| ... | ... | ... |
| TV | 24 | 3 |
| ... | ... | ... |

FIG. 18

| DIVISION NUMBER OF DISPLAYABLE REGION | AREA OF FIRST (MAXIMUM) DISPLAYABLE REGION | AREA OF SECOND DISPLAYABLE REGION | DIVISION PATTERN |
|---|---|---|---|
| 1 | A | - | PATTERN 1 |
| 1 | B | - | PATTERN 2 |
| ⋮ | ⋮ | ⋮ | ⋮ |
| 2 | A | AA | PATTERN 3 |
| 2 | A | BB | PATTERN 4 |
| 3 | A | - | PATTERN 5 |
| ⋮ | ⋮ | ⋮ | ⋮ |

PATTERN 1

PATTERN 2

PATTERN 3

PATTERN 4

PATTERN 5

DISPLAY DEVICE AND DISPLAY CONTROL DEVICE

TECHNICAL FIELD

The present invention relates to a display device and a display control device, and more particularly, to a display device that controls an image displayed on a display panel when an abnormality occurs in the display panel.

BACKGROUND ART

A display device includes a display panel, and displays one or multiple images on the display panel. For example, a display device on vehicle displays an image of the map of a car navigation, an image for an operation of a car navigation and the like. In addition, information indicating the state of an in-vehicle audio device, images for an operation, and images of video stored in the storage medium such as DVD (Digital Video Disc) are displayed. In addition, the display device may display single information like a car navigation screen, and may display multiple images including a car navigation image and an image of the audio device (Patent Document 1).
[Patent Document 1] Japanese Patent Application Publication No. 2008-306411

DISCLOSURE OF THE INVENTION

Problems to be Solved by the Invention

However, when a failure occurs in the display panel, the image to be displayed is not displayed. Thus, there is a problem that images and information to be displayed are not displayed. The present invention was made in view of above problems, and has an object of displaying images on a display panel in a proper form when an abnormality occurs in the display panel.

Means for Solving the Problems

The present invention is a display device including: a display panel on which images are displayed and which includes a plurality of display regions; a plurality of driving units that display the images in the plurality of display regions; a displayable region detecting unit that detects a displayable region at a time of abnormality of the display panel; an abnormality-time display image generating unit that generates an abnormality-time display image according to the displayable region detected by the displayable region detecting unit; and an abnormality-time display control unit that displays the abnormality-time display image generated by the abnormality-time display image generating unit in the displayable region while causing a driving units of the plurality of driving unit of which a corresponding display region is the displayable region to display an image in the corresponding display region.

In addition, the present invention is a display control device that executes a display control of a display panel on which images are displayed and which includes a plurality of display regions, the display control device including: a displayable region detecting unit that detects a displayable region at a time of abnormality of the display panel; an abnormality-time display image generating unit that generates an abnormality-time display image according to the displayable region detected by the displayable region detecting unit; and an abnormality-time display control unit that displays the abnormality-time display image generated by the abnormality-time display image generating unit in the displayable region while causing a driving unit of a plurality of driving units which displays the images in the plurality of display regions of which a corresponding display region is the displayable region to display an image in the corresponding display region.

Effects of the Invention

According to the present invention, it is possible to display an image on a display panel in a proper form even when an abnormality occurs in part of the display panel.

BRIEF DESCRIPTION OF THE DRAWINGS

FIG. 17 illustrates an example of a priority table;

FIG. 18 illustrates an example of a division pattern table;

MODES FOR CARRYING OUT THE INVENTION

Hereinafter, a description will be given of embodiments with drawings.

First Embodiment

Figure 1:
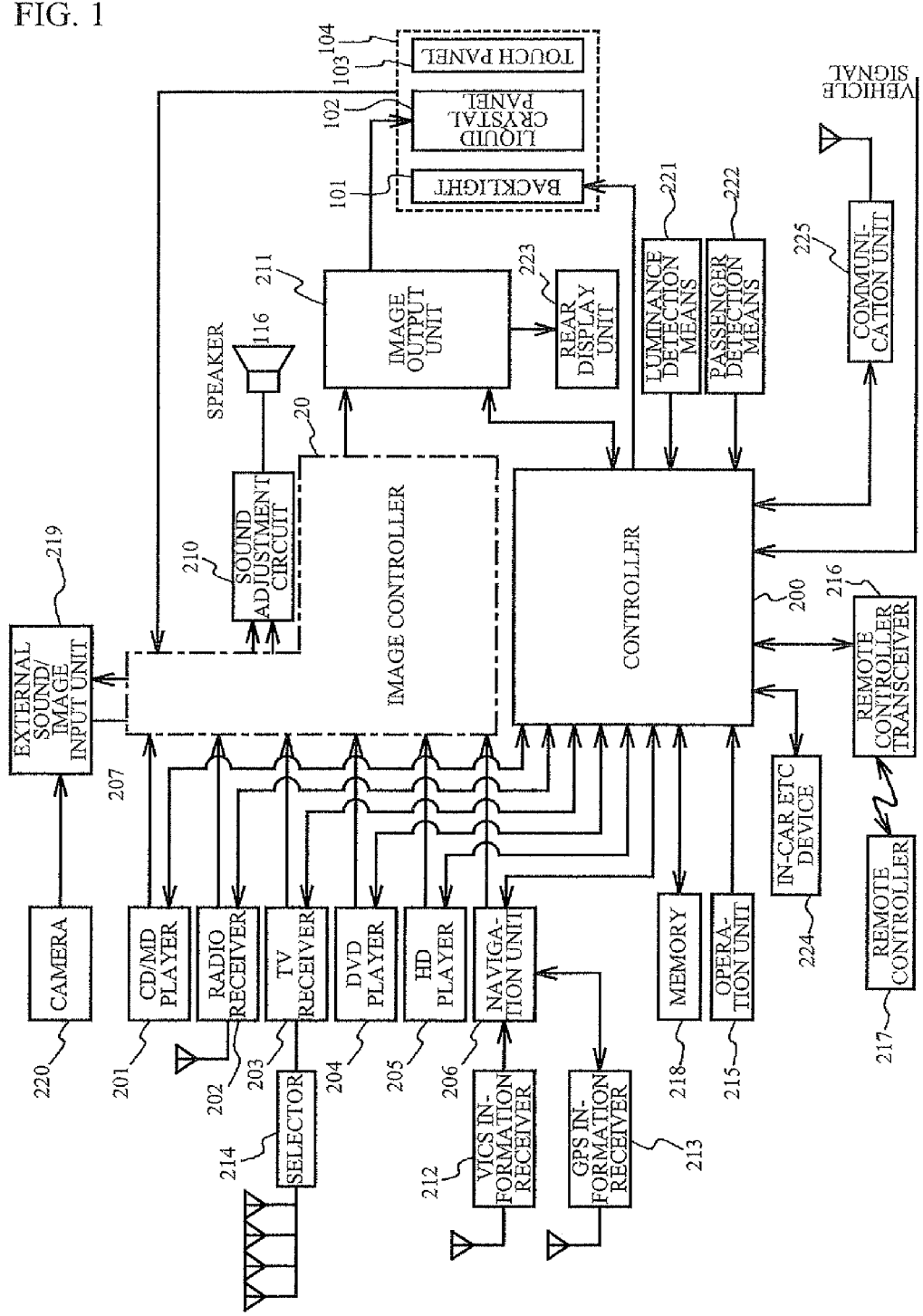
FIG. 1 is a block diagram of a display device in accordance with a first embodiment.

A first embodiment is an example of an in-car display device that displays a vehicle control image such as a speedometer in addition to a car navigation image and the like. FIG. 1 is a block diagram illustrating an overview of an in-vehicle display device in accordance with the first embodiment. It is an example of an application to a so-called Audio Visual Navigation complex device. In FIG. 1, 104 is a display unit, 200 is a controller, 201 is a CD (Compact Disk)/MD (Mini Disk) player, 202 is a radio receiver, 203 is a TV receiver, 204 is a DVD player, 205 is an HD (Hard Disk) player, 206 is a navigation unit, 20 is an image controller, 210 is a sound adjustment circuit, 211 is an image output unit, 212 is a VICS (Vehicle Information and Communication System) information receiver, 213 is a GPS (Global Positioning System) information receiver, 214 is a selector that selects an antenna, 215 is an operation unit, 216 is a remote control transceiver that transmits and receives information from a remote controller 217, 218 is a memory, 219 is an external sound/image input unit, 220 is a camera, 221 is a luminance detection means, 222 is a passenger detection means, 223 is a rear display unit, 224 is an in-car ETC (Electronic Toll Collection) device, and 225 is a communication unit. In a number of examples of products, the image output unit 211 and the display unit 104 are unitized and form the display panel, and the present embodiment has such a configuration.

The display unit 104 is composed of a touch panel 103, a liquid crystal panel 102 and a back light 101. A flat panel display driven by matrix drive other than the liquid crystal panel 102, such as an organic EL display panel, a plasma display panel, and a cold cathode flat panel display, may be used for the display unit 104.

An image combining process, an image scaling process, and an adjustment process of brightness, color tone and contrast are executed to images from various sources (the CD/MD player 201, the radio receiver 202, the TV receiver 203, the DVD player 204, the HD player 205 and the navigation unit 206) by the image controller 20, and the processed and adjusted images are displayed on the display unit 104 via the image output unit 211. The distribution to each speaker 116, a volume and sound are adjusted in the sound adjustment circuit 210, and the adjusted sound is output from the speaker 116.

The controller 200 receives an operation signal based on the user operation, instruction signals (vehicle signals) from devices and a vehicle, and various signals such as a vehicle speed, a rotational speed of engine, and various alarms, and executes the process, such as an operation control of each component and a setting of contents of image processing, based on such signals. In addition, information reporting the abnormality of the display unit 104 is input to the image controller 20 from the display unit 104.

The memory 218 is formed from a nonvolatile memory and a volatile memory, the nonvolatile memory storing data for executing various processes described later, such as data for determining the priority, the image data for displaying a failure, data for sound control, and parameters for image processing, and the volatile memory being used for various calculation processes. Various programs and data for image processing used by the image controller 20 are stored in a memory inside the image controller 20 (using a nonvolatile memory), used from the memory 218 directly, used by transferring data in the memory 218 to the (volatile) memory inside the image controller 20 at the start-up, or used with the combination of above methods.

Figure 2:
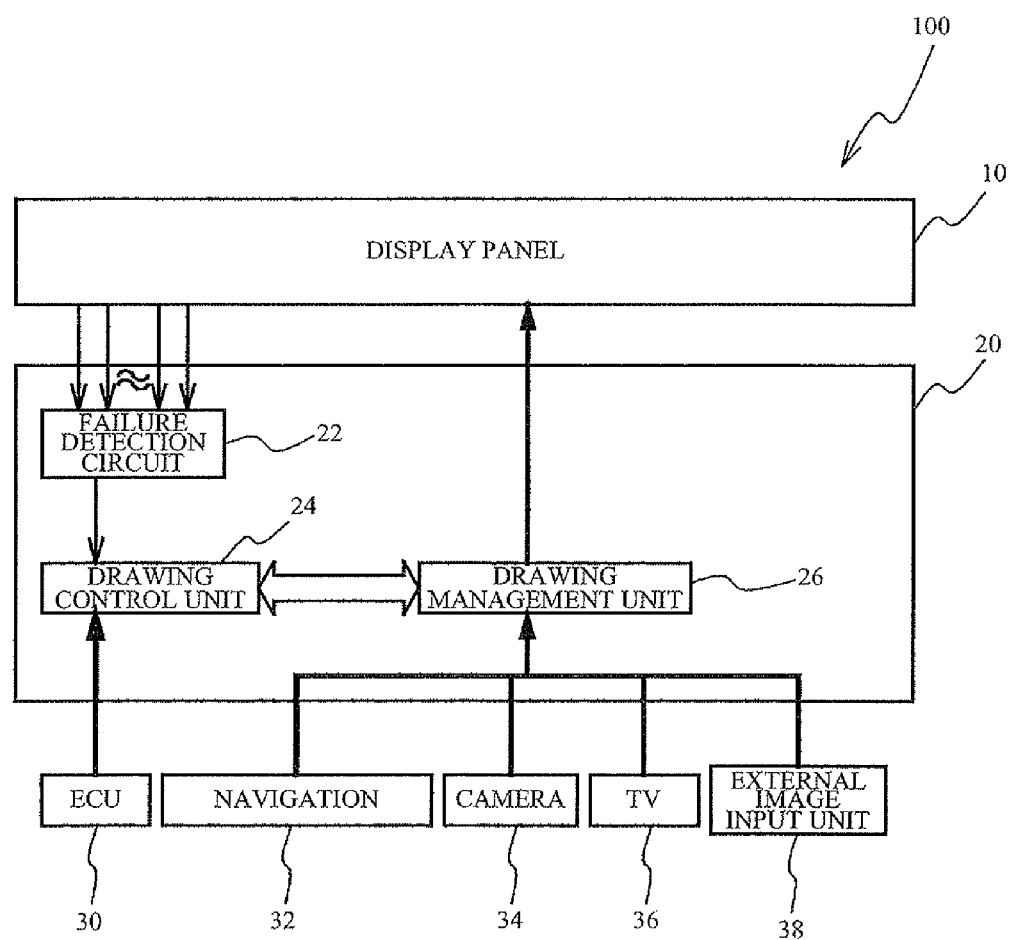
FIG. 2 is a block diagram of a vicinity of an image controller.

FIG. 2 is a block diagram of a vicinity of the image controller 20 in FIG. 1. As illustrated in FIG. 2, a display device 100 is provided with a display panel 10, the controller 20 and the like. The controller 20 corresponds to the image controller 20 in FIG. 2, and is provided with a failure detection circuit 22, a drawing control unit 24, and a drawing management unit 26. An in-car ECU (Electronic Control Unit) 30, a navigation device 32, a camera 34, a television receiver 36 and an external image input unit 38 are coupled to the controller 20.

The navigation device 32 corresponds to the navigation unit 206 in FIG. 1, and outputs signals such as a map image to guide a vehicle to the destination based on the positional information of the vehicle received by the GPS information receiver 213, an image relating to information around the destination, and an image for receiving an input to control the car navigation device 32 to the controller 20. The camera 34 corresponds to the camera 220 in FIG. 1, and outputs a signal of an image of rearward of the vehicle to the controller 20. The television receiver 36 corresponds to the TV receiver 203 in FIG. 1, receives a digital broadcasting and an analog broadcasting, and outputs signals of images to the controller 20. The external image input unit 38 corresponds to the DVD player 204 and the HD player 205 in FIG. 1, is an input circuit to which a reproducing device of a storage medium such as a DVD and a Blu-ray is connected and the image signal is input, and outputs the image signal of the external devices connected thereto to the controller 20. The ECU 30 is an electric unit that controls the power train such as an engine in the vehicle and electric components such as an air conditioner, and outputs information about a vehicle speed, information about the abnormality inside the vehicle, information about the air conditioner, and information about an audio to the controller 20.

In the controller 20, when the display panel 10 is normal (when the failure does not occur), the drawing management unit 26 executes the combining, scaling and superimposing of images by using image signals from devices 32 through 38, and outputs an image signal to the display panel 10. The failure detection circuit 22 monitors a display state signal of the display panel 10, and detects the abnormality such as the failure of the display panel 10. When the failure detection circuit 22 detects the failure of the display panel 10, the failure detection circuit 22 outputs a display abnormality detection signal to the drawing control unit 24. The drawing control unit 24 recognizes the area where the failure occurs in the display panel 10 based on the display abnormality detection signal and the signal from the ECU 30. Furthermore, the drawing control unit 24 controls the combination and the layout of images input from devices 32 through 38, and outputs the control signal to the drawing management unit 26. In addition, it orders the change of contents of image signals output to the devices 32 through 38. The detail of the control of the controller 20 will be described later.

Figure 3:
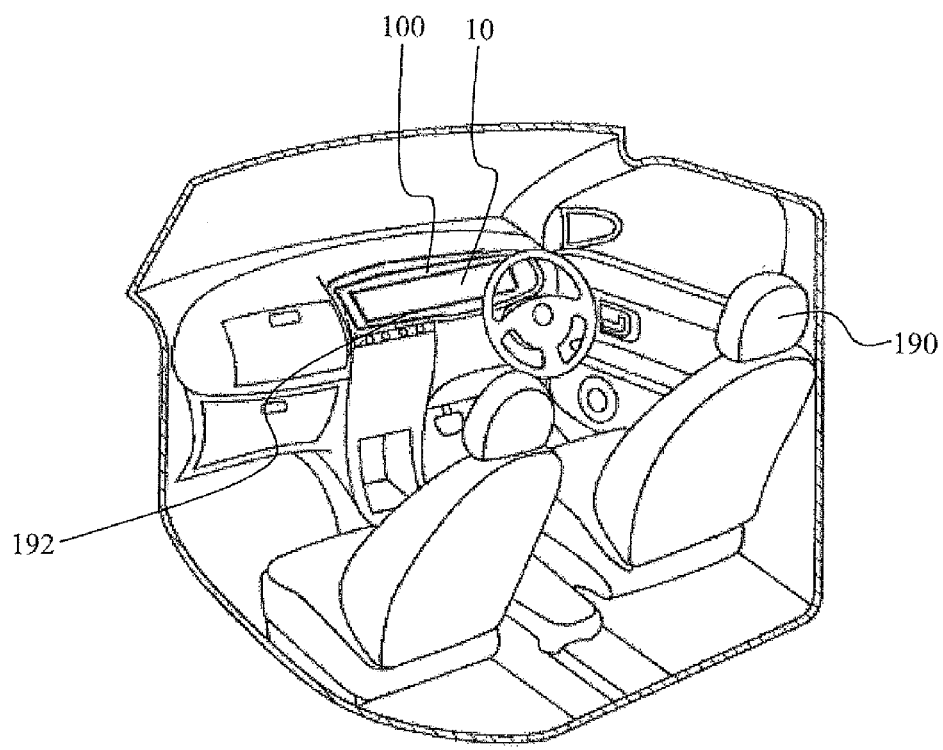
FIG. 3 illustrates a mounting example of a display device in a vehicle.

FIG. 3 is a diagram illustrating a mounting position of the display device 100 inside the vehicle. The display device 100 is located from a dashboard 192 to a driver seat 190 to display an image for vehicle control such as a speedometer in addition to a car navigation image. When the image for vehicle control such as a speedometer is not displayed, it may be located only in the dashboard 192. The mounting position of the display device 100 is not limited to the above location if it is located in the location where the user can see. For example, the display device 100 may be mounted around a sun visor.

Figure 4:
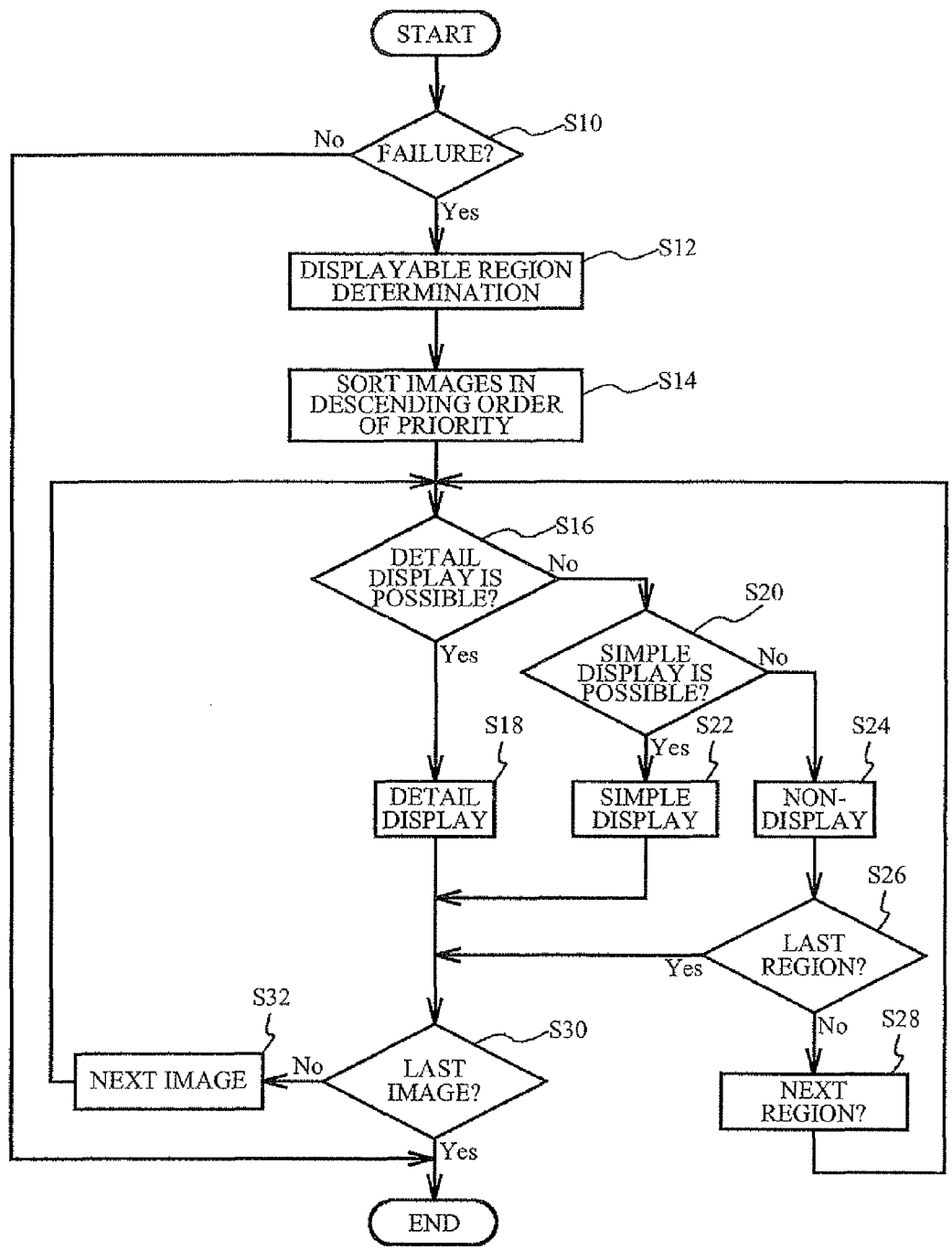
FIG. 4 is a flowchart illustrating a process of a controller in accordance with the first embodiment.
Figure 5A:
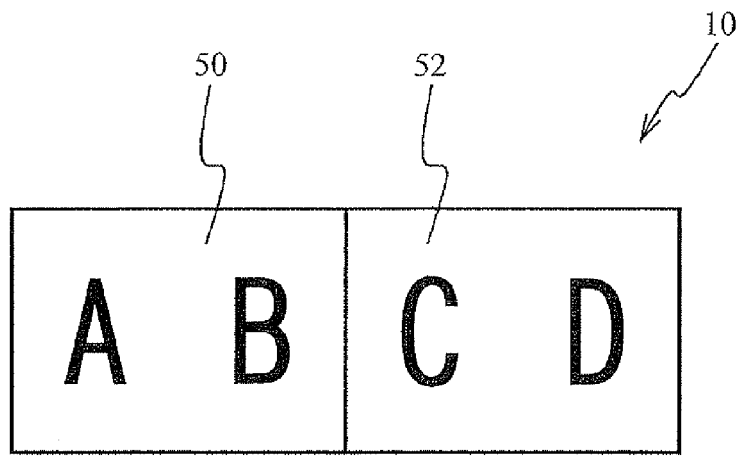
FIG. 5A through FIG. 5C are diagrams (No. 1) illustrating screens of a display panel of the first embodiment.
Figure 5B:
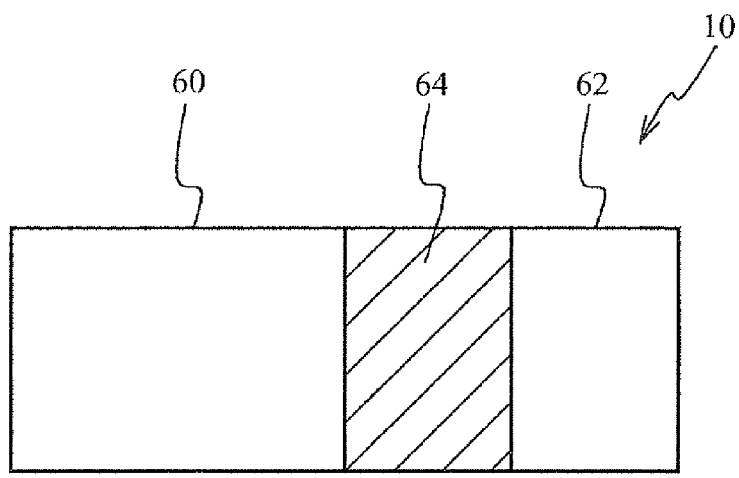
Figure 5C:
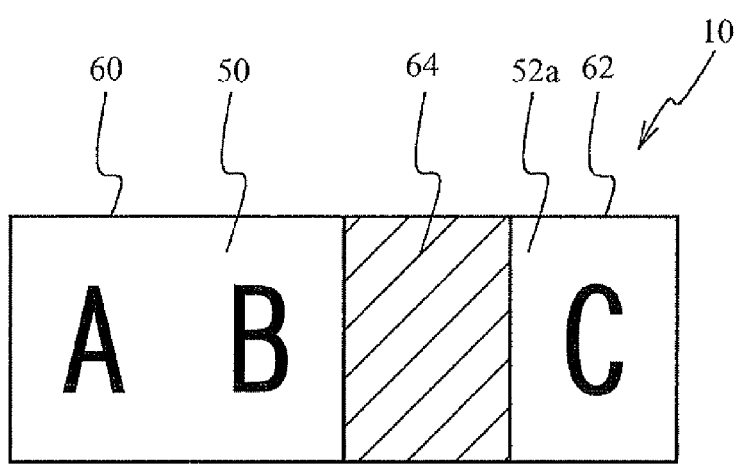

FIG. 4 is a flowchart illustrating a process of the drawing control unit 24 of the controller 20. FIG. 5A through FIG. 5C illustrate screens of the display panel 10. FIG. 5A illustrates an image before a failure occurs in the display panel 10 (i.e. a normal-time image displayed on the display panel 10 at the normal time). Images 50 and 52 are displayed on the display panel 10. As illustrated, the normal-time image is formed from multiple image elements. For example, they are a navigation screen, a screen for an audio, a screen of a speedometer that have an image having a single meaning.

Referring to FIG. 4, the drawing control unit 24 determines whether the failure occurs in the display panel 10 (i.e. whether the time of abnormality or not) based on the display abnormality detection signal from the failure detection circuit 22 and the signal from the ECU 30 (step S10). In case of No, the process is ended. In case of Yes, a displayable region detecting means of the drawing control unit 24 detects the displayable region (step S12). For example, in FIG. 5B, the drawing control unit 24 recognizes a failure region 64 in the display panel 10, and determines that regions 60 and 62 are displayable regions. Then, images 50 and 52 being displayed are sorted in descending order of priority (step S14). For example, the drawing control unit 24 determines that priorities of the image obliged to be displayed and the image that user prefers are high. In FIG. 5A, the priority of the image 50 is higher. Here, the priority may be set by a user.

The drawing control unit 24 determines whether the image 50 can be displayed in detail in the region 60 (step S16). In case of Yes, as illustrated in FIG. 5C, the drawing control unit 24 causes the drawing management unit 26 to display the image 50 in the region 60 (step S18). The drawing control unit 24 determines whether it is a last image (step S30). In case of No, a next image 52 is set (step S32), and a process goes back to the step S16. In the step S16, the image 52 cannot be displayed in detail in the region 62 for example. The drawing control unit 24 determines whether the image 52 can be displayed in a simple manner (step S20). In case of Yes, as illustrated in FIG. 5C, the drawing control unit 24 causes the drawing management unit 26 to display the image 52a, which is a simplified image of the image 52, in the region 62. In case of No in the step S20, the drawing control unit 24 prohibits the drawing management unit 26 from displaying the image 52 (step S24). Alternatively, it reports the non-displayable state to the outside. Then, the drawing control unit 24 determines whether it is a last region (step S26). In case of No, it sets a next region (step S28), and goes back to the step S16. In case of Yes, it goes to the step S30. Then, in case of Yes in the step S30, the process is ended.

As described above, an abnormality-time display image generating means of the drawing control unit 24 generates an abnormality-time display image (an image displayed at the abnormal time, i.e. images 50 and 52a in FIG. 5C which are presented when the display panel is in the abnormal state) according to the displayable region detected by the displayable region detecting means. An abnormality-time display control means of the drawing control unit 24 displays the abnormality-time display image generated by the abnormality-time display image generating means on the displayable region. According to this, even though an abnormality occurs in part of the display panel 10, it is possible to display the image on the display panel 10 in a proper form.

Figure 6A:
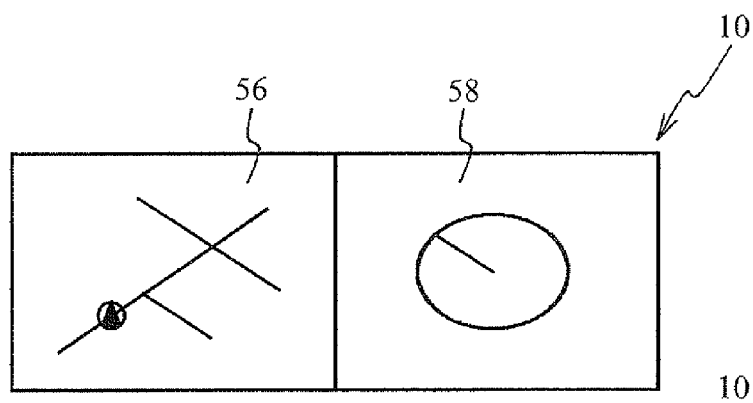
FIG. 6A through FIG. 6D are diagrams (No. 2) illustrating screens of the display panel of the first embodiment.
Figure 6B:
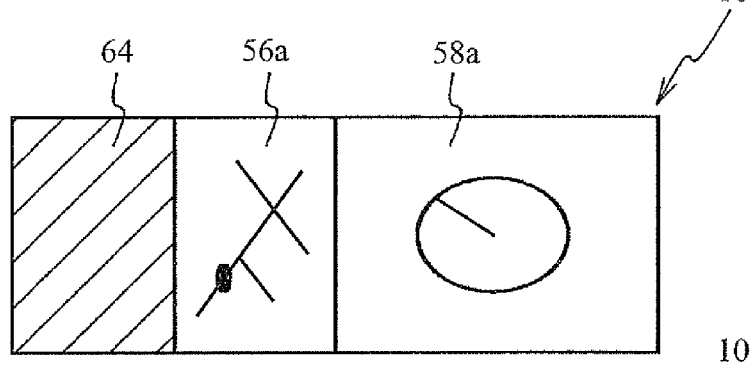

FIG. 6A through FIG. 6D are other examples of images that the display panel 10 displays. FIG. 6A illustrates an image before the failure occurs (i.e. a normal-time image). An image 56 is an image presenting a map of the navigation device. As illustrated, the normal-time image is formed from multiple image elements. An image 58 is an image of a speedometer. As illustrated in FIG. 6B, a failure occurs in the left region 64 of the display panel 10, and the display is impossible in the region 64. In regard to the priority of the image, the priority of the image 58 is higher because the display of the vehicle speed which indicates the speed of the vehicle is obliged by statute.

Figure 6C:
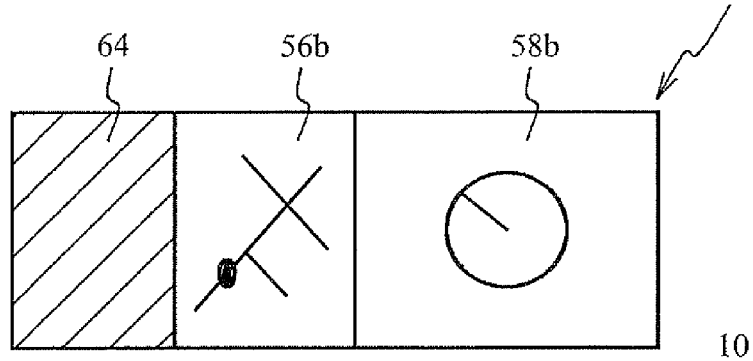
Figure 6D:
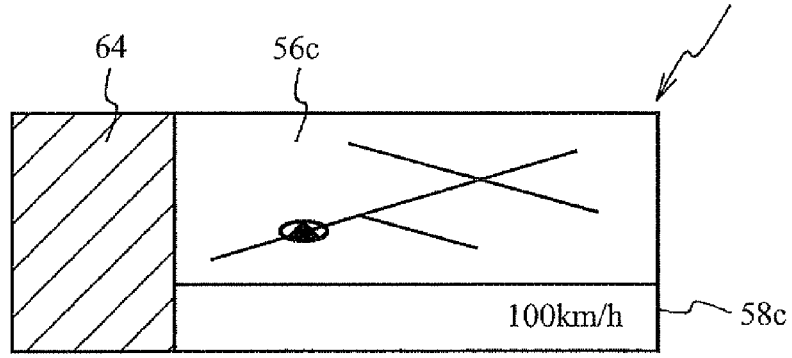

Thus, as illustrated in FIG. 6B, the drawing control unit 24 displays the image 58 of which the priority is higher without changing it, and display an image 56a which is a reduced image of the image 56. In addition, as illustrated in FIG. 6C, the drawing control unit 24 displays images 56b and 58b by changing reduction ratios of the image 58 of which the priority is higher and the image 56 of which the priority is lower in multiple images. At this time, it is preferable that the reduction ratio of the image of which the priority is higher is made small (or the image of which the priority is higher is enlarged). Furthermore, as illustrated in FIG. 6D, the drawing control unit 24 displays an image 58c which simply presents the vehicle speed which can be displayed in a simple manner such as a digital display, and display an image 56c which is a processed image of the image 56 to fit the rest of the region.

Figure 7A:
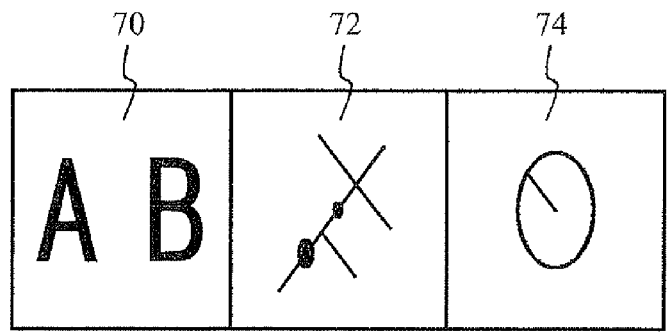
FIG. 7A through FIG. 7D are diagrams (No. 3) illustrating screens of the display panel of the first embodiment.
Figure 7B:
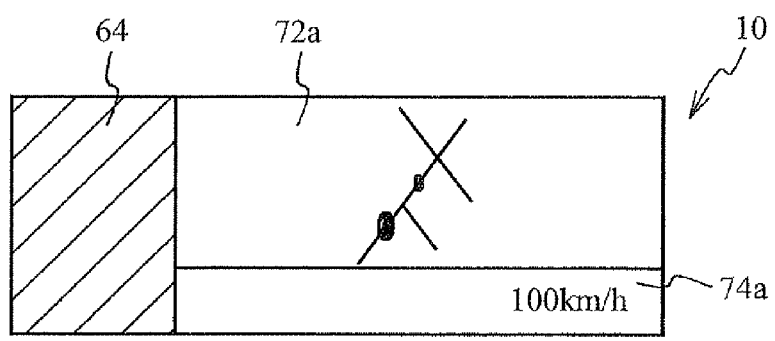

FIG. 7A through 7D are other examples of images that the display panel 10 displays. FIG. 7A illustrates an image before a failure occurs (the normal-time image). An image 70 is an image of the television, an image 72 is an image showing the map of the navigation device, and an image 74 is an image of the speedometer. As illustrated, the normal-time image is formed from multiple image elements. As illustrated in FIG. 7B, a failure occurs in the left region 64 of the display panel 10, and the display is impossible in the region 64. The priority of the image 74 of the vehicle speed is highest as the priority of the image. The priority of the image 70 of the television is lowest.

Figure 7C:
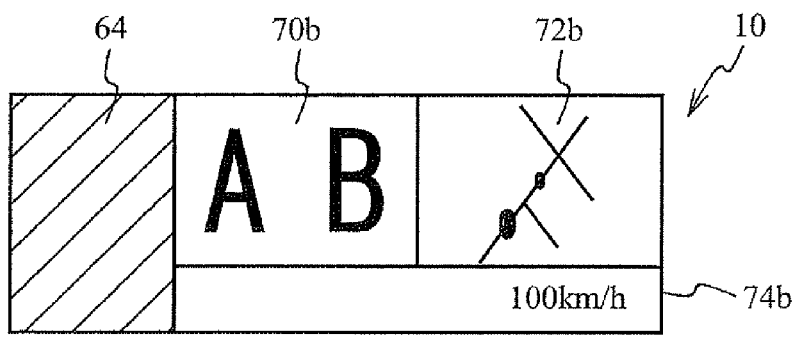
Figure 7D:
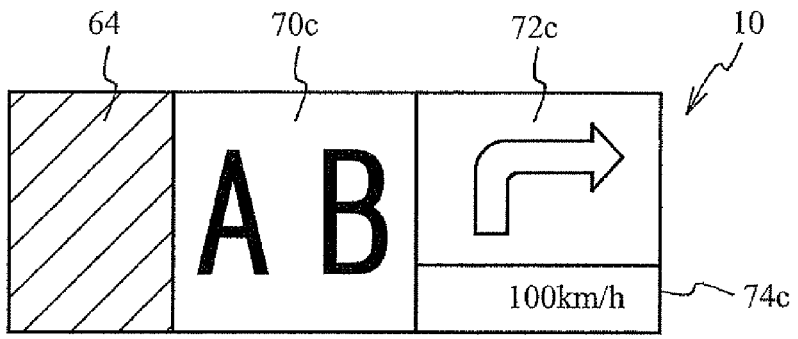

Thus, as illustrated in FIG. 7B, the drawing control unit 24 does not display the image 70 of which the priority is lowest, displays a simplified image 74a which is the simplified image of the image 74 which can be displayed in a simple manner, and displays an image 72a which is the processed image of the image 72 to fit the rest of region. In addition, as illustrated in FIG. 7C, the drawing control unit 24 displays a simplified image 74c of the image 74 which can be displayed in a simple manner, and displays images 70b and 72b which are formed by reducing images 70 and 72 to fit the rest of the region respectively. Furthermore, as illustrated in FIG. 7D, the drawing control unit 24 displays simplified images 72c and 74c of images 72 and 74 which can be displayed in a simple manner, and displays an enlarged image 70c of the image 70 in the rest of the region. The image 72c is an image showing the distance to the intersection and the traveling direction at the intersection.

Figure 8A:
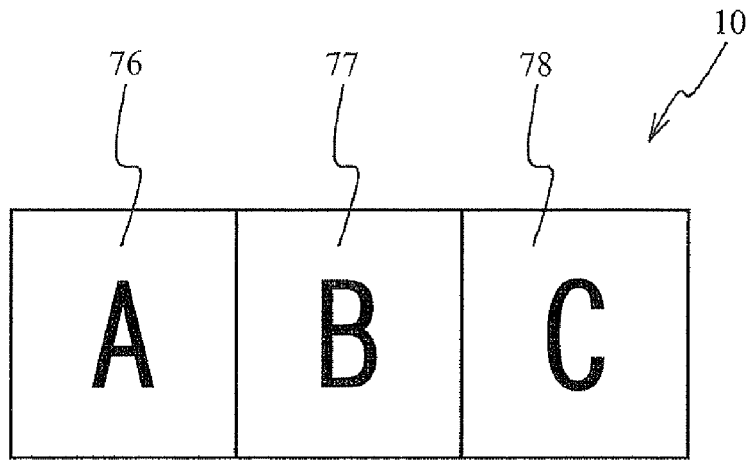
FIG. 8A through FIG. 8C are diagrams (No. 4) illustrating screens of the display panel of the first embodiment.
Figure 8B:
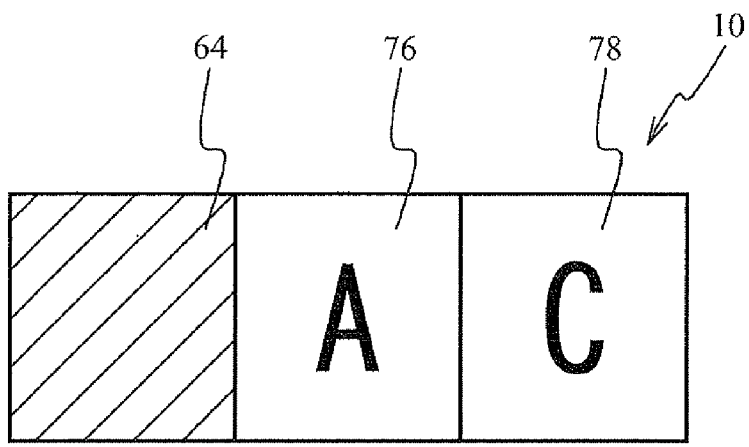
Figure 8C:
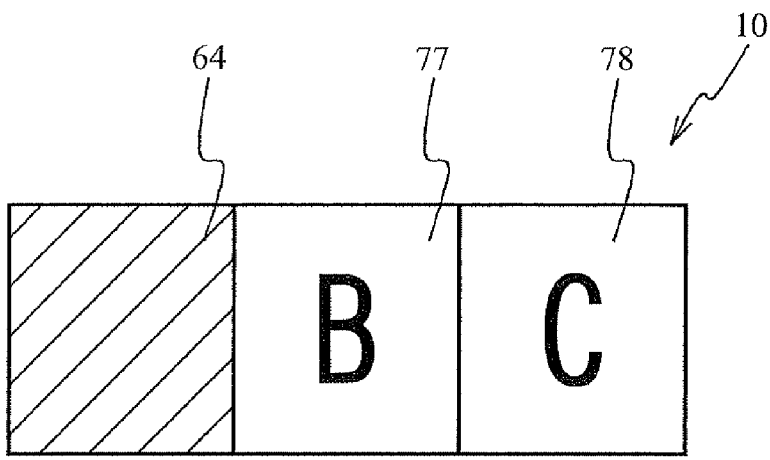

FIG. 8A through FIG. 8C are further examples of images that the display panel 10 displays. FIG. 8A illustrates an image before a failure occurs (the normal-time image). The images 76 through 78 are displayed on the display panel 10. As illustrated, the normal-time image is formed from multiple image elements. As illustrated in FIG. 8B, a failure occurs in the left region 64 of the display panel 10, and the display is impossible in the region 64. The priority of the image 78 is highest as the priority of the image. The image 76 is displayed in the displayable region other than the region where the image 78 is displayed. Then, as illustrated in FIG. 8C, an image 77 is displayed instead of the image 76. As described above, the images of which the priority is low may be displayed alternately. When displaying images 76 and 77 alternately, the display time of the image of which the priority is high in images 76 and 77 may be longer than the display time of the image of which the priority is low.

The display time is changed based on the level of detail of the image instead of given priorities. For example, the detail image may be displayed long, and the non-detail image may be displayed short. According to this, the user can recognize a detail image which takes time for recognition. As illustrated in FIG. 8B and FIG. 8C, although rest of images may be displayed alternately with displaying part of images, all images 76 through 78 may be displayed alternately. In addition, images 76 and 77 may be scrolled.

As described above, when the controller 20 detects the failure of the display panel 10, it controls the image to be displayed on the display panel based on at least the priority of the image to be displayed, whether the image to be displayed can be displayed in a simple manner, or information of the displayable region in the display panel. According to this, even though a failure occurs in part of the display panel 10, it is possible to display the important image. As described in the first embodiment, when displaying the navigation image and the image used as the vehicle speed display device on the same display panel 10, the image used as the vehicle speed display device is an image of which the display is obliged by statute, and is the important image.

In regard to the display priority, for example, priorities of the image of the display obliged to be displayed by statute, the display of the interrupt image such as the display of the abnormality, an image guiding a user operation such as an guide of the intersection in a navigation, an image showing the state which is changing in displays showing the vehicle state, the image indicating the state which does not change in displays showing the vehicle state, and the image showing the result of the user operation are high in this order. The information about the vehicle speed, the lighting information which indicates whether the direction indicator is lighting, the lighting information of front and rear fog lamps, the lighting information of width indicators and tail lamps, the lighting information of head lamps, and information confirming the fastening of the seat belt, the information indicating the abnormality in the effluvium prevention device of the toxic gas, and information indicating the abnormality of the braking device such as anti-lock brake, a foot brake, and a side brake are examples of information obliged to be displayed by statute.

The display priority may be determined by the content of the image in addition to the given priority described above. For example, it is possible to determine the priority by the level of detail of the image. In addition, the detail image may have higher priority. In addition, it is possible to determine the priority by the number of items displayed in the image. For example, the image of which the number of items is larger may have a higher priority.

The method of displaying image in a simple manner may be a method of displaying the meter display by a graph or numerals, a method of switching the display method of characters (text), or a method of rotating the image for example. A method of changing text direction, a method of displaying characters by illustration, and a method of outputting the sound instead of displaying characters are examples of the method of switching the display method of characters. The method of rotating the image may be a method of turning the image 90 degrees when the displayable region is a landscape-oriented region and the image is an oblong image for example. The information relating to the displayable region of the display panel 10 is a position, area or shape of the displayable region for example.

A program (subroutine) for standard display and standard display data and a program (subroutine) for simple display and simple display data are prepared (stored) with respect to each element images, and whether the image is displayed in a standard manner (not displayed in a simple manner) or is displayed in a simple manner may be selected based on which display is carried out.

As illustrated in FIG. 6B through FIG. 6D and FIG. 7B through FIG. 7D, when the controller 20 detects the failure in the display panel 10, it changes reduction ratios of multiple images displayed on the display panel 10 before the failure occurred, and displays images displayed on the display panel 10 before the failure occurred. According to this, the image displaying the important information is not made small, and unimportant images are displayed small.

Furthermore, as illustrated in FIG. 6D and FIG. 7B through FIG. 7D, when the controller 20 detects the failure in the display panel 10, if at least one of multiple images displayed on the display panel 10 before the failure occurred can be displayed in a simple manner, the controller 20 displays at least one image on the display panel 10 in a simple manner. That is to say, the abnormality-time display image generating means generates the substitution image corresponding to the image displayed at the normal time as the abnormality-time display image. According to this, even when the region which can display the image becomes small because of the failure of the display panel 10, it is possible to display important information.

In addition, as illustrated in FIG. 7B, when the controller 20 detects the failure in the display panel 10, it is possible not to display at least one image of multiple images displayed on the display panel 10 before the failure occurred. It is possible to prevent the important image from not being displayed by not displaying the image of which the priority is low.

In addition, as illustrated in FIG. 8B and FIG. 8C, when the controller 20 detects the failure of the display panel 10, it alternately displays at least two images 76 and 77 of multiple images 76 through 78 displayed on the display panel before the failure occurred. That is to say, the abnormality-time display image generating means generates processed image elements according to the displayable region as the abnormality-time display image based on image elements. The abnormality-time display control means displays processed image elements on the displayable region by switching them sequentially. According to this, it is possible to display many images on the display panel 10.

Furthermore, the controller 20 makes the display times of at least two images 76 and 77 different from each other. According to this, the important image and the detail image can be displayed longer.

As described above, when the controller 20 detects the failure in the display panel 10, it changes at least one image of multiple images displayed on the display panel 10 before the failure occurred, and display it on the display panel 10. That is to say, the abnormality-time display image generating means generates a selected image based on the image element selected from the normal-time image, which is displayed at the normal time, according to the displayable region as the abnormality-time display image. According to this, it is possible to make the user recognize multiple images more properly.

Moreover, as described above, it is possible to change the size of the image, change the display time of at least one of multiple images, change the display order of multiple images, or change the display frequency of at least one of multiple images as the control of the image.

Second Embodiment

Figure 9:
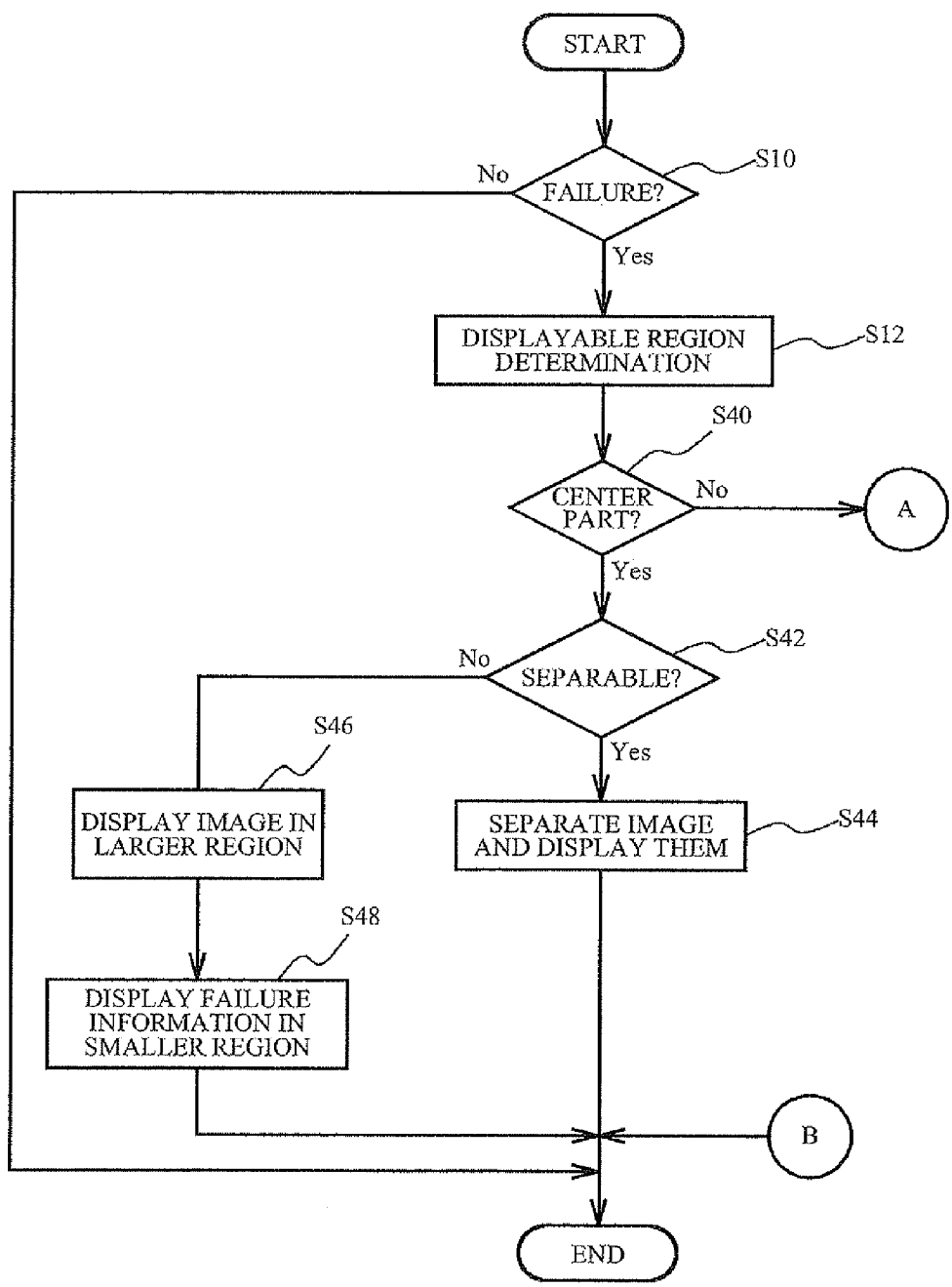
FIG. 9 is a flowchart (No. 1) illustrating a process of a controller in accordance with a second embodiment.
Figure 10:
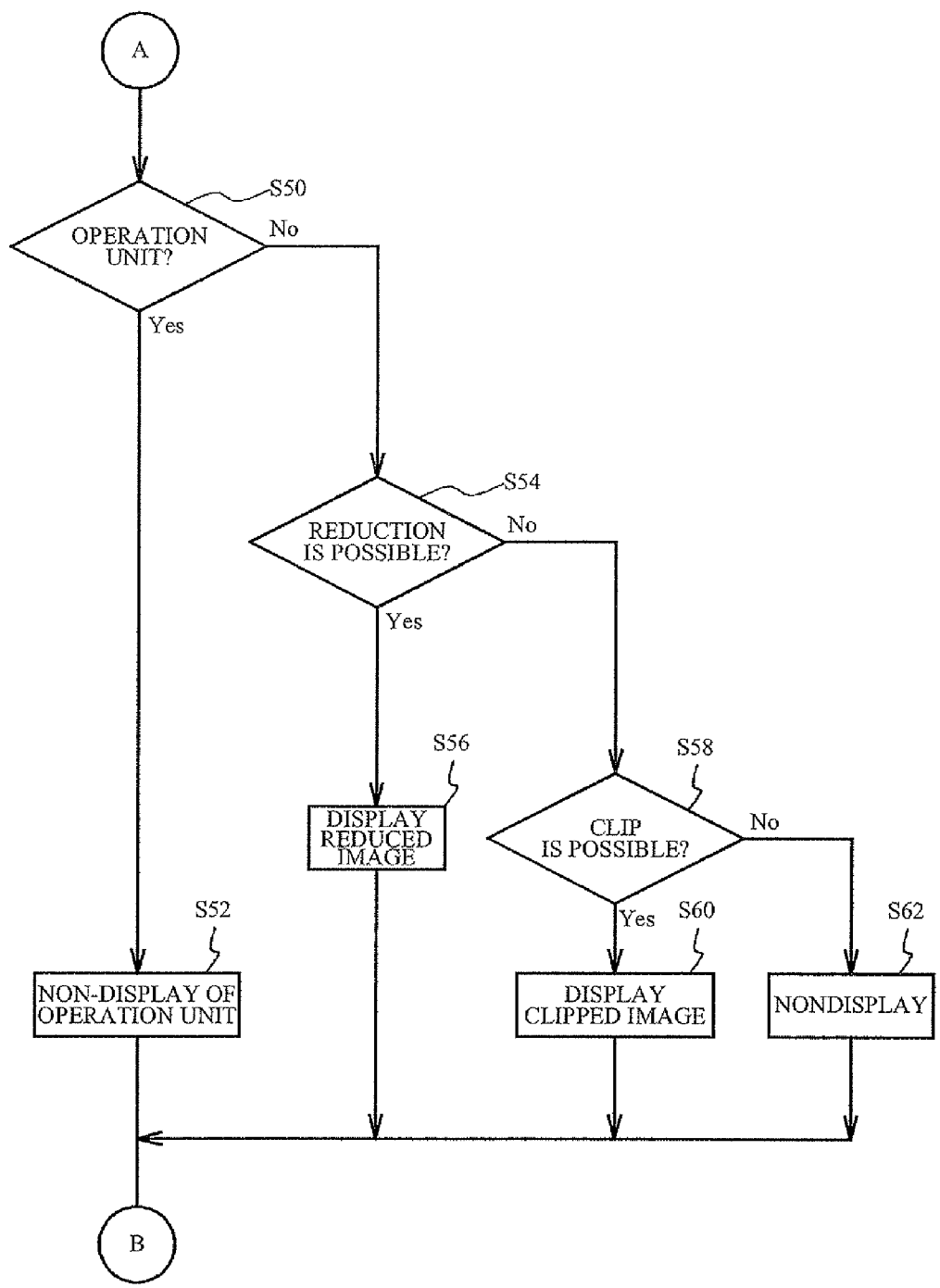
FIG. 10 is a flowchart (No. 2) illustrating the process of the controller of the second embodiment.
Figure 11A:
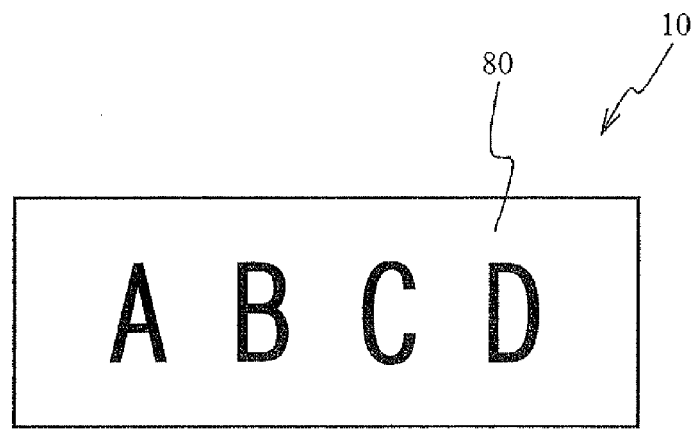
FIG. 11A through FIG. 11C are diagrams (No. 1) illustrating screens of a display panel of the second embodiment.
Figure 11B:
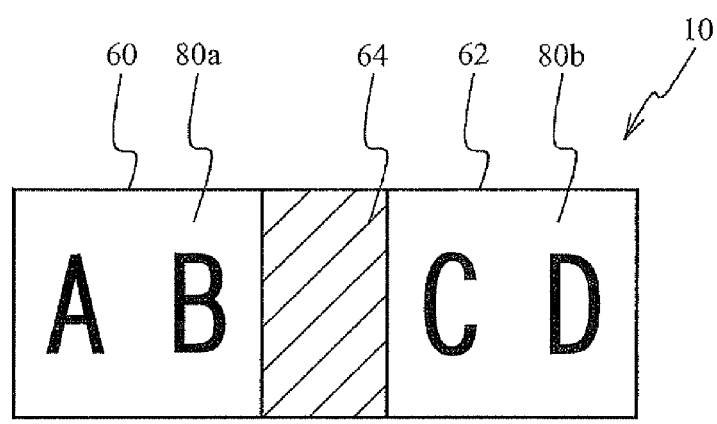

A second embodiment is a diagram illustrating another control of the controller 20. FIG. 9 and FIG. 10 are flowcharts illustrating processes of the drawing control unit 24 of the controller 20. FIG. 11A through FIG. 16B illustrate screens displayed on the display panel 10. Before the failure occurs, an image 80 is displayed on the whole of the display panel 10 as illustrated in FIG. 11A. Here, the image 80 may be a single image, or may be multiple images as described in the first embodiment. Referring to FIG. 9, as the steps S10 and S12 are same as those in FIG. 4, a description will be omitted. After the step S12, the drawing control unit 24 determines whether the failure region (non-displayable region) is a center part of the display panel 10 (step S40). Here, the center part means the region that divides the displayable region into at least two regions as illustrated in FIG. 11B when the failure occurs in the center part. The center part does not mean the region including the center of the display panel 10 itself (the intersection of diagonal lines). The center part is defined to use the divided displayable regions effectively. In case of Yes, the drawing control unit 24 determines whether the image 80 displayed before the failure occurs is separable (step S42). For example, the map image is separable, but the images of television and storage medium and the image where the characters will be separated are non-separable. In addition, when the image 80 is formed from multiple independent images, the image 80 is separable. In case of Yes, the drawing control unit 24 displays images 80a and 80b separated from the image 80 in the displayable regions 60 and 62 as illustrated in FIG. 11B (step S44). At this time, images 80a and 80b may be enlarged or reduced images of image 80 to fit displayable regions 60 and 62. Then, the process is ended.

Figure 11C:
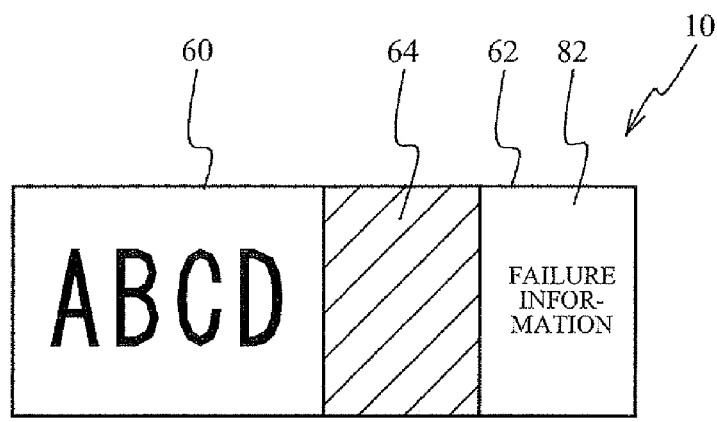

In case of No in the step S42, as illustrated in FIG. 11C, the drawing control unit 24 displays an image 80c which is a reduced image of the image 80 in the region 60 which is a larger region of displayable regions (step S46). Then, it displays information indicating that the failure occurs in the display panel 10 in the region 62 which is a smaller region of displayable regions (step S48). The information indicating the failure state such as information indicating the failure region may be displayed in the region 62. Then, the process is ended.

Figure 12A:
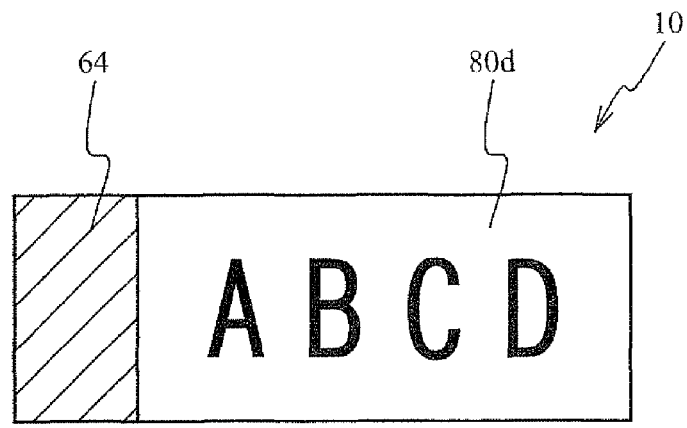
FIG. 12A and FIG. 12B are diagrams (No. 2) illustrating screens of the display panel of the second embodiment.
Figure 12B:
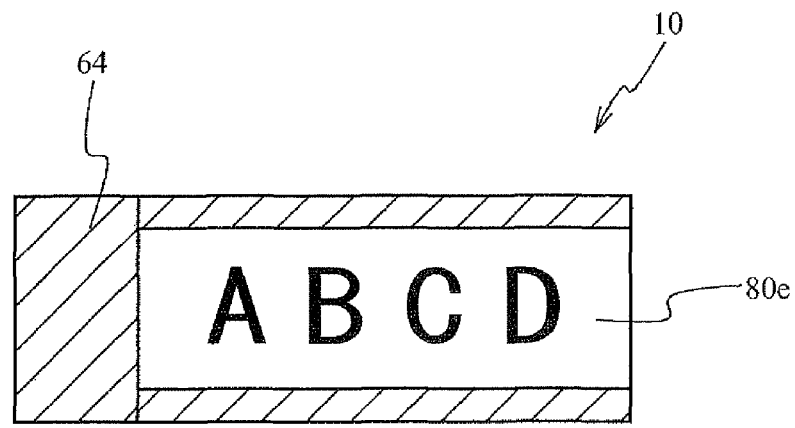

In case of No in the step S40, that is to say, when the failure region 64 is an edge part of the display panel 10, referring to FIG. 10, the drawing control unit 24 determines whether the failure region 64 is a region for the touch-panel input (step S50). In case of No, the drawing control unit 24 determines whether the image 80 can be reduced (step S54). In case of Yes, as illustrated in FIG. 12A, an image 80d which is made by reducing the image 80 in one axis direction is displayed on the display panel 10 (step S56). As illustrated in FIG. 12B, it is possible to display an image 80e which is made by reducing the image 80 symmetrically about the horizontal axis and the vertical axis on the display panel 10.

As described above, the enlargement/reduction process of the image is executed according to the ratio of the size of the element image and the size of the display region. For example, the compression in the vertical direction is executed according to the ratio in the vertical direction, and the compression in the horizontal direction is executed according to the ratio in the horizontal direction. When the change of the ratio of the image is not desired, it may be possible to adjust the compression ratio to the larger one, and lay out the image so that the image is located at the center position of the displayable region. At this time, the part with no image because of the compression process may be a black image. Methods heretofore known such as combination of a thinning process and a supplemental (filtering) process may be used as a compression method.

Figure 13A:
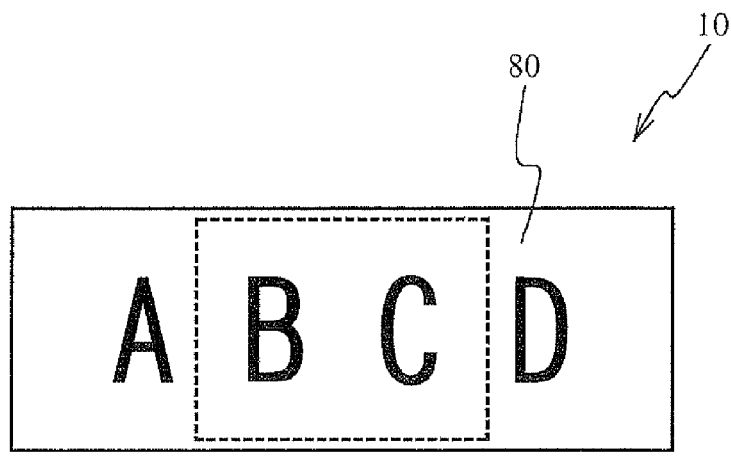
FIG. 13A and FIG. 13B are diagrams (No. 3) illustrating screens of the display panel of the second embodiment.
Figure 13B:
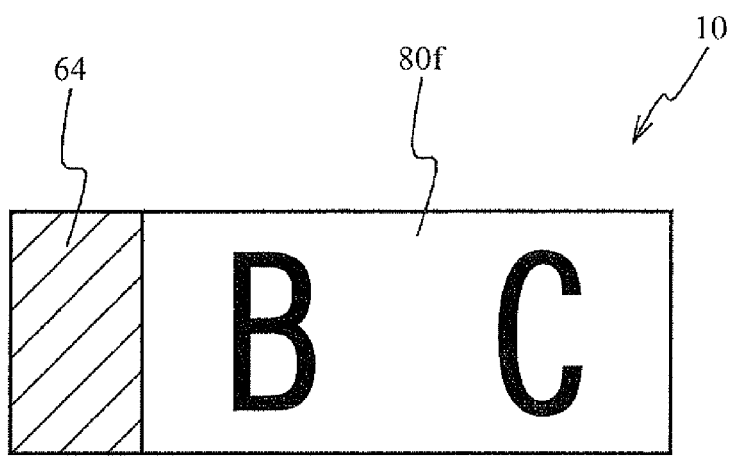
Figure 14A:
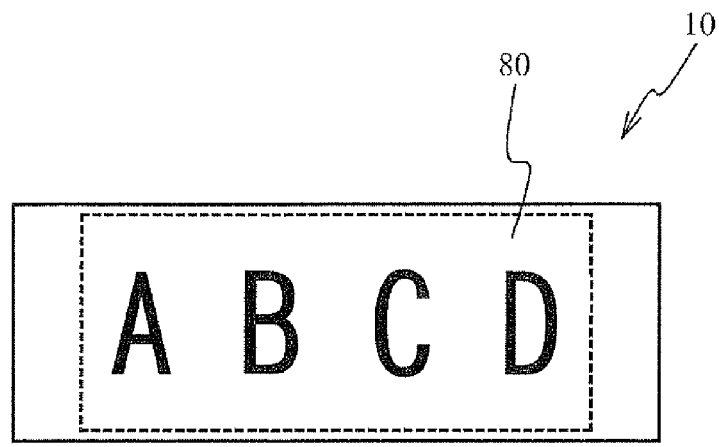
FIG. 14A and FIG. 14B are diagrams (No. 4) illustrating screens of the display panel of the second embodiment.
Figure 14B:
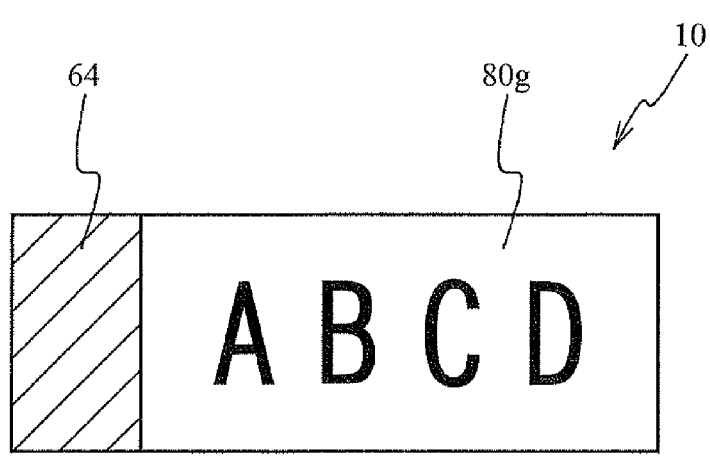

In case of No in the step S54, the drawing control unit 24 determines whether a clip of part of the image 80 is possible (step S58). In case of Yes, a part of the image 80 before the failure occurred (a region surrounded by a dashed line in FIG. 13A) is clipped as illustrated in FIG. 13A, and is enlarged and displayed on the display panel 10 as illustrated in FIG. 13B (step S60). The part of the image 80 before the failure occurred (a region surrounded by a dashed line in FIG. 14A) may be clipped as illustrated in FIG. 14A, and may be displayed on the display panel 10 without being enlarged or reduced as illustrated in FIG. 14B. It is preferable that the clipped region of the image 80 includes important information. For example, in a case of the map image for the navigation, the center of screen, a vehicle position, information about a traveling direction of the vehicle and operation unit for operating a navigation are regions in which important information is included. In addition, it is possible to change the clipped region depending on whether the upper side of the map means north (north UP) or whether the upper side of the map means the traveling direction (heading UP). For example, the region including the traveling direction of the vehicle may be preferentially clipped.

Figure 15:
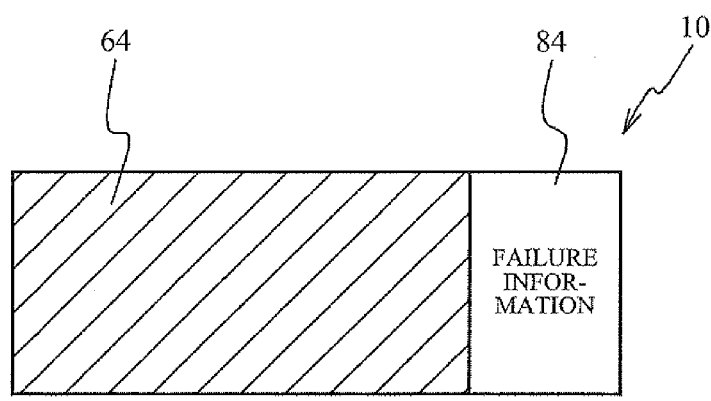
FIG. 15 is a diagram (No. 5) illustrating a screen of the display panel of the second embodiment.

In case of No in the step S58, the drawing control unit 24 does not display the image 80 (step S62). For example, when the area of the failure region 64 is large as illustrated in FIG. 15, the image 80 is not displayed, and an image 84 presenting the failure information that indicates that the failure occurs in the display panel 10 is displayed. Then, the process is ended.

Figure 16A:
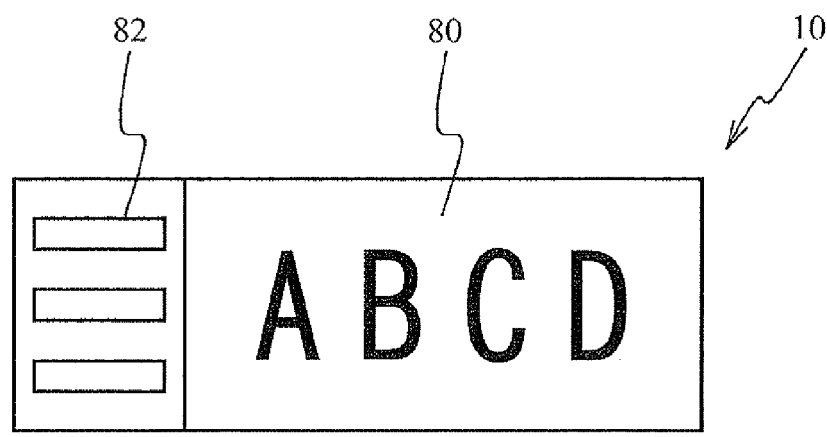
FIG. 16A and FIG. 16B are diagrams (No. 6) illustrating screens of the display panel of the second embodiment.
Figure 16B:
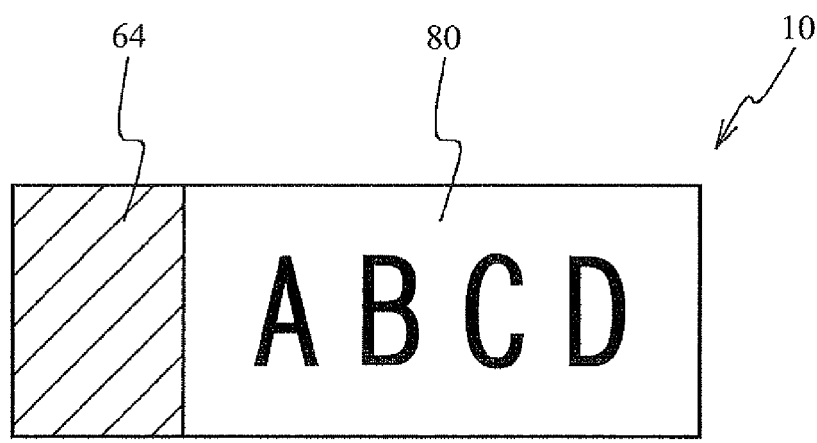

A description will now be given of a case where the determination is Yes in the step S50. FIG. 16A illustrates a screen before the failure occurs. An image 82 of the operation unit for the touch-panel input is displayed. Generally, the touch panel receives the operation when the user touches a certain image. The image that the user touches is defined as the operation unit. Assume that the region where the image 82 was displayed becomes the failure region 64 as illustrated in FIG. 16B. There may be a case that the image 82 of the operation unit of the touch panel does not function as the operation unit of the touch panel even though it is displayed in the displayable region. Hence, the drawing control unit 24 does not display the image 82 of the operation unit of the touch panel (step S52). Then, the process is ended. In FIG. 16A and FIG. 16B, although the image 82 of the operation unit becomes the failure region 64, the failure region 64 may be a region other than the image 82 of the operation unit.

The image of the operation unit of the touch panel is generated by superimposing the background image (e.g. the map image) to the image of the operation unit separately generated (a superimposing process). Thus, in the step S52, this superimposing process only has to be terminated. When displaying the image of the operation unit of the touch panel, the processes relating the coordinate of the touch panel to the image of the operation unit, and detecting and executing the operation according to the input coordinate of the touch panel are executed, but it is preferable to terminate these processes.

As described in the step S52, the position of the image of the operation unit may be changed according to the position and size of the image 80 instead of not displaying the image 82 of the operation unit.

In the step S46 in FIG. 9, procedures from steps S50 through S62 in FIG. 10 may be executed. That is to say, the non-display of the operation unit of the touch panel, the reduction of the image, and the clip of the image may be carried out.

According to the second embodiment, as illustrated in FIG. 11B, when the controller 20 detects the failure of the region 64 which crosses the center of the display panel 10, it displays the image 80 displayed on the display panel 10 before the failure occurred on regions 60 and 62 which are divided by the failure region by separating the image 80. According to this, the reduction of the separable image such as a map can be minimum.

In addition, as illustrated in FIG. 11C, when the controller 20 detects the failure in the region 64 crossing the center of the display panel 10, it displays the image 80 displayed on the display unit before the failure occurred in the region 60 of regions 60 and 62 divided by the failure region. That is to say, when a number of displayable regions are formed, the abnormality-time display image generating means generates the abnormality-time display image according to the displayable region 60 of which the area is larger as the abnormality-time display image. The abnormality-time display control means displays the abnormality-time display image in the displayable region 60 of which the area is larger. According to this, it is possible to display the television image and characters which have difficulty in the recognition when being separated without separating them.

Furthermore, as illustrated in FIG. 11C, the controller 20 displays information, which indicates that the failure occurs, in the displayable region 62 other than the region 60. According to this, the user can recognize the failure of the display panel 10. Here, a description was given of the method of presenting the failure information and making the user recognize it, but other means such as sound may be used to report the failure information.

Furthermore, as described in steps S42 through S46 in FIG. 10, the controller 20 selects whether it displays the image in regions 62 and 64 divided by the failure region 64 by separating the image or displays the image 80 in the region 60, depending on the type of the image 80.

In addition, as illustrated in FIG. 12A, when the controller 20 detects the failure of the display panel 10, it reduces the image 80 displayed on the display panel 10 before the failure occurred and display it. That is to say, the abnormality-time display image generating means generates the reduction image which is made by reducing the size of the normal-time image displayed at the normal time according to the displayable region. According to this, the whole of the image 80 can be displayed in the displayable region.

Furthermore, as illustrated in FIG. 13B and FIG. 14B, when the controller 20 detects the failure of the display panel 10, it displays only a part of the image 80 displayed on the display panel 10 before the failure occurred on the display panel 10. That is to say, the abnormality-time display image generating means generates the clipped image formed by clipping the normal-time image displayed at the normal time according to the displayable region as the abnormality-time display image. According to this, the important region of the image 80 can be displayed without being fairly reduced.

In addition, as illustrated in FIG. 16B, when the controller 20 detects the failure of the display panel 10, it chooses not to display the operation unit of the touch panel displayed on the display panel 10 before the failure occurred. That is to say, the abnormality-time display image generating means generates the operation unit deletion image where the image for the touch-panel operation included in the normal-time image displayed at the normal time is deleted as the abnormality-time display image.

In first and second embodiments, if the controller 20 changes the image just before the user operates it, there is a case that the operation contrary to the user intention is carried out. Thus, the controller 20 may prohibit the operation for a certain period of time when it changes the image displayed on the display panel 10. According to this, the malfunction can be suppressed.

FIG. 17 illustrates the example of the priority table provided to the controller 20 in first and second embodiments. As illustrated in FIG. 17, the controller 20 has a table of priority and display time with respect to the element image type (type of the image element). For example, the priority of the traveling speed is first, and the priority of the rotational speed of engine is second. The controller 20 determines the priority with respect to each element image types from the table illustrated in FIG. 17. In addition, the controller 20 determines the display time of the image with respect to each type of element image in FIG. 8B and FIG. 8C.

Figure 19A:
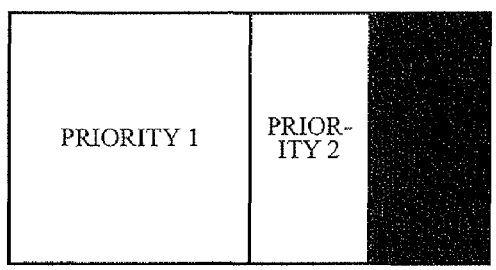
FIG. 19A through FIG. 19E are diagrams illustrating screens of the display panel.
Figure 19B:
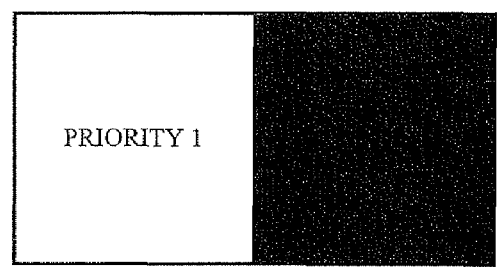

FIG. 18 illustrates a division pattern table provided to the controller 20 in first and second embodiments. FIG. 19A through FIG. 19B illustrate screens displayed on the display panel 10. A white region is the displayable region in the display panel 10, and represents the region where the image is displayed. A black region represents the non-displayable region. A hatched region is the displayable region, and represents the region where a black screen is displayed for example.

As illustrated in FIG. 18, a table of division patterns to be selected depending on the division number of the displayable region and the area of the displayable region is provided. For example, when the division number of the displayable region is 1, and the area of a displayable region 1 of which the area of the displayable region is largest is in the range of A, the controller 20 displays images of which priorities are first and second as illustrated in FIG. 19A. In addition, as illustrated in FIG. 18, when the division number of the displayable region is 1, and the area of the displayable region 1 is in a range B which is smaller than the range A, the controller 20 displays only the image of which the priority is first as illustrated in FIG. 19B.

Figure 19C:
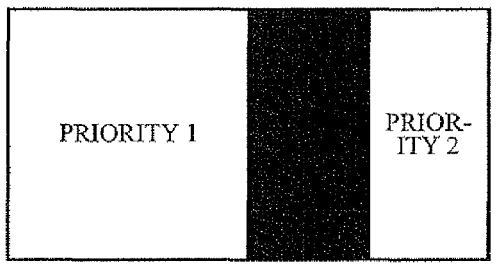
Figure 19D:
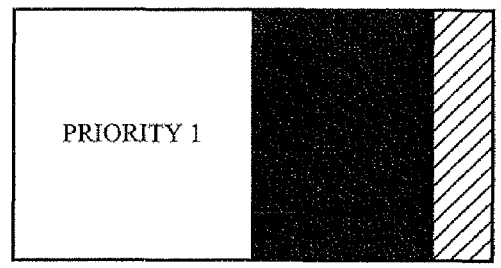

As illustrated in FIG. 18, when the division number of the displayable region is 2, the area of the displayable region 1 is in a range A, and the area of a displayable region 2 is in a range AA for example, the controller 20 displays the image of which the priority is first in the displayable region 1 and displays the image of which the priority is second in the displayable region 2 as illustrated in FIG. 19C. In addition, when the division number of the displayable region is 2, the area of the displayable region 1 is in a range A, and the area of the displayable region 2 is in a range BB which is smaller than the range AA as illustrated in FIG. 3, the controller 20 displays the image of which the priority is first in the displayable region 1 and displays a black image in the displayable region 2 as illustrated in FIG. 19D.

Figure 19E:
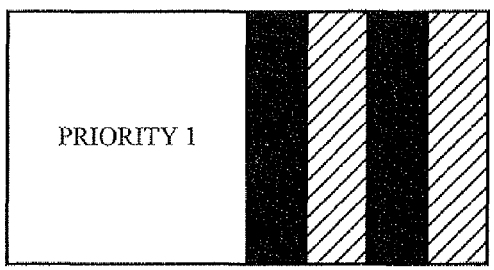

As illustrated in FIG. 18, when the division number of the displayable region is 3 and the area of the displayable region 1 is in a range A for example, the controller 20 displays an image of which the priority is first in the displayable region 1, and displays black images in the displayable regions 2 and 3 as illustrated in FIG. 19E.

Third Embodiment

Figure 20:
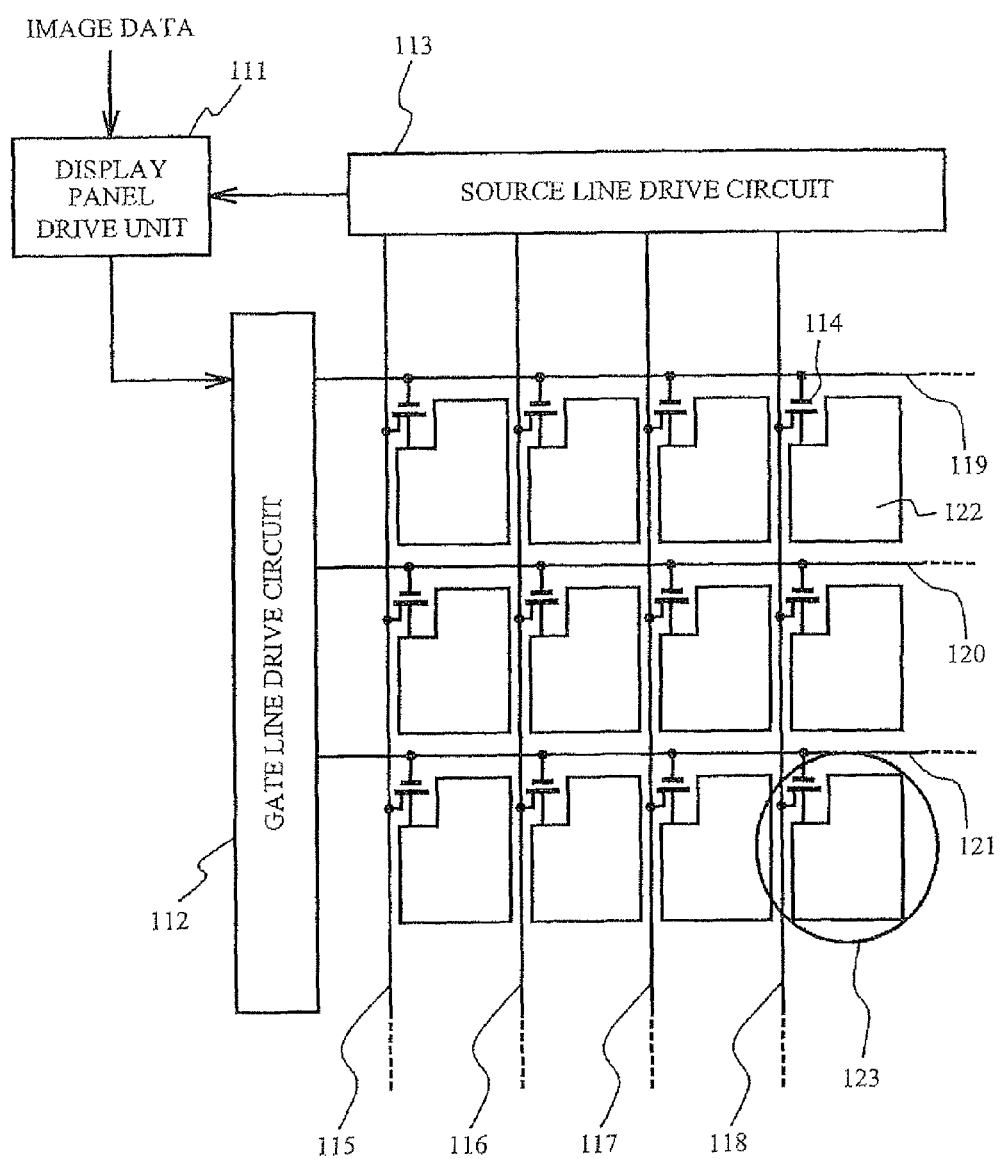
FIG. 20 is a block diagram of a display panel in accordance with a third embodiment.

FIG. 20 is a circuit diagram illustrating an overview of the TFT (Thin Film Transistor) liquid crystal panel of a third embodiment. 111 is a display panel drive unit, 112 is a gate line drive circuit (gate drive unit), 113 is a source line drive circuit (source drive unit), 114 is a TFT element, 115 through 118 are source lines, 119 through 121 are gate lines, 122 is a pixel electrode, and 123 is a subpixel.

As illustrated in FIG. 20, a number of subpixels 123 are formed in the region surrounded by source lines 115 through 118 and gate lines 119 through 121 as a unit. The pixel electrode 122 applying the voltage to the crystal liquid layer and the TFT element 114 that executes the switching control of the pixel electrode 122 are formed in each subpixel. The display panel drive unit 111 controls drive timings of the gate line drive circuit 112 and the source line drive circuit 113. The gate line drive circuit 112 executes the selective scan of the TFT element 114, and the source line drive circuit 113 controls the applied voltage to the pixel electrode 122.

A dot clock signal, source data, and a source start signal are input to the source line drive circuit 113. The dot clock signal is a signal for the timing control in the display operation of the TFT liquid crystal display panel, and each part of the TFT liquid crystal display panel executes the process in synchronization with the dot clock signal. The source data is a signal indicating the voltage applied to the source line, which means the data indicating the brightness of the pixel. In addition, the source start signal is a signal indicating a timing to import the source data. If the operation will be described simply, the source data becomes data indicating the brightness of the pixel of the intersection of the gate line 119 and the source line 115. At this time, the source start signal is supplied to the source line 115 (Hi level), the source data at that time is read as the brightness data of the pixel, and the applied voltage to the pixel electrode is set. At the next timing of the dot clock signal, the source data becomes data indicating the brightness of the pixel of the intersection of next (right) gate line 119 and source line 116. In addition, the source start signal is supplied to the next source line 116 (Hi level).

Then, the source data at that time is read as the brightness data of the pixel, and the applied voltage to the pixel electrode is set. That is to say, the source data becomes the brightness data to the next pixel sequentially in synchronization with the dot clock signal. In addition, the source start signal moves to next in synchronization with the dot clock signal, and the applied voltage to the corresponding pixel is set sequentially. Then, when the applied voltages for one gate line are set, set voltages are applied to respective source lines, and the gate start signal is supplied to the gate line 119 (Hi level), set voltages are applied to respective pixel electrodes corresponding to the gate line 119, and each pixel has a brightness according to the image. The operation described above is carried out to each gate line sequentially, and when the process is executed in all gate lines, the single image is displayed.

The source line drive circuit 113 is a heretofore known circuit composed of a buffer circuit, a D/A converter, a flip/flop, a logic circuit and the like, and executes above-described operations in synchronization with the dot clock signal. In addition, the gate line drive circuit 112 is a same circuit as the source line drive circuit 113, and main different point from the source line drive circuit 113 is that the data corresponding to the source data does not exist, and the move (transmission) of the gate start signal is executed at the interval of the one horizontal synchronization period.

Figure 21:
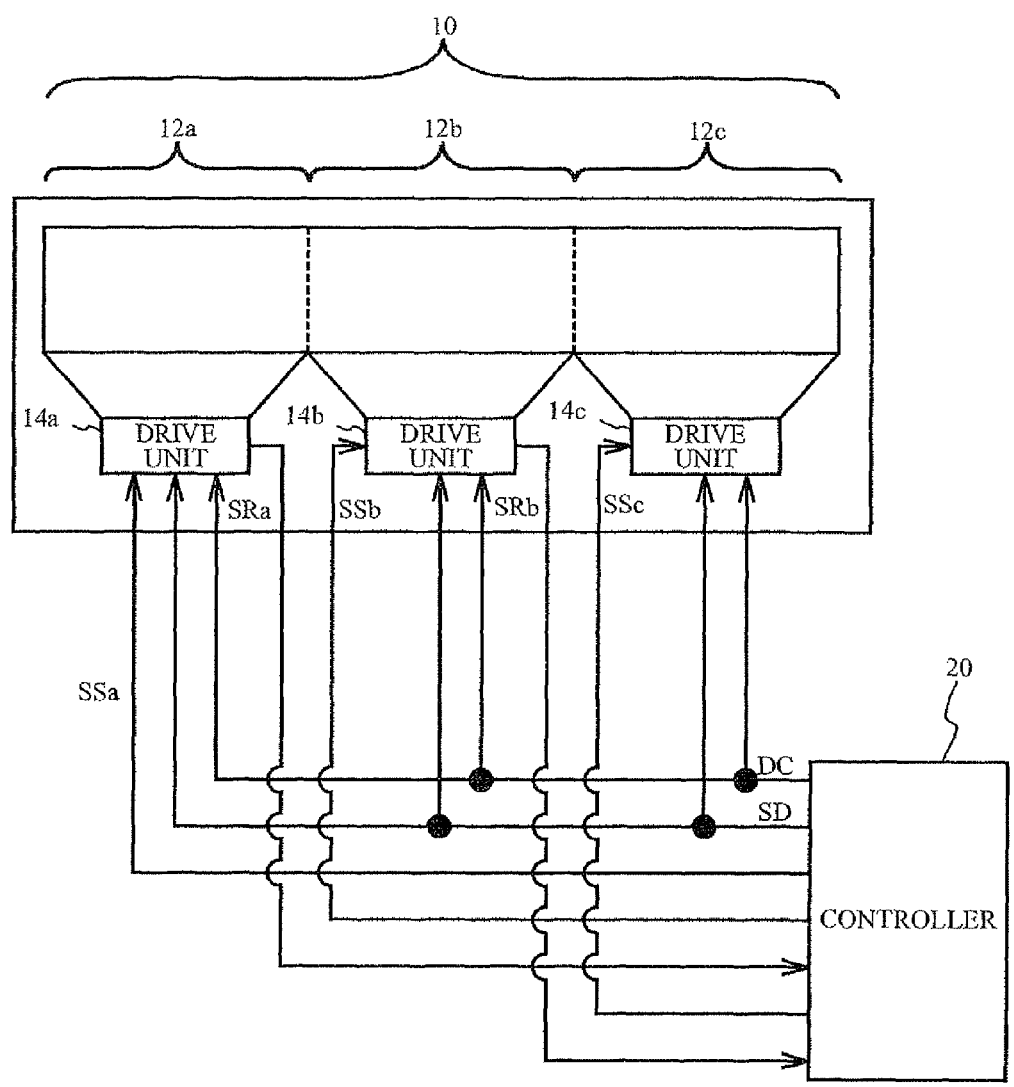
FIG. 21 is a block diagram of a vicinity of the display panel of the third embodiment.

FIG. 21 is a block diagram illustrating a vicinity of the display panel 10 of the third embodiment when the failure does not occur. Referring to FIG. 21, the display panel 10 includes display regions 12a through 12c. Drive units 14a through 14c correspond to the display panel drive unit 111 in FIG. 20, and display images in display regions 12a through 12c respectively. The controller 20 outputs the dot clock signal DC, the source data SD, and source start signals SSa through SSc to drive units 14a through 14c. Drive units 14a and 14b output return signals SRa and SRb to the controller 20.

Figure 22:
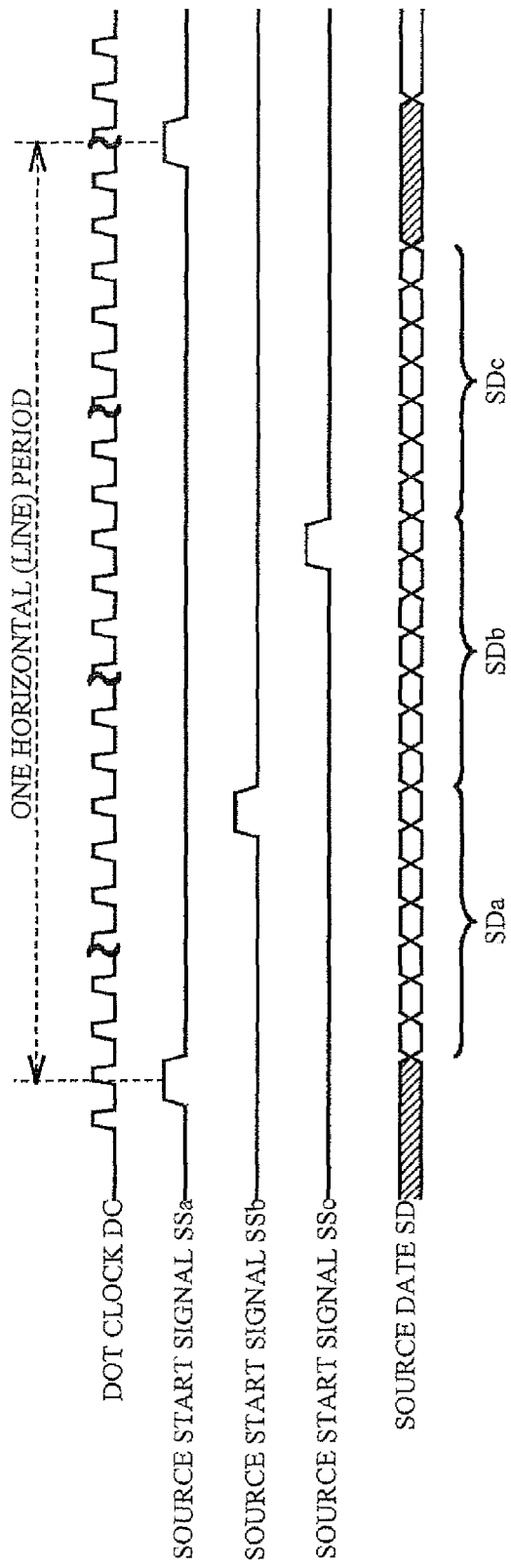
FIG. 22 illustrates a timing chart of a dot clock, a source start signal and source data before a failure occurs in a display region in the third embodiment.

FIG. 22 is a diagram illustrating timings of the dot clock signal DC, source start signals SSa through SSc and source data SD. Referring to FIG. 22, one horizontal (line) period corresponds to the period for which a signal for one horizontal line is input. When the source start signal SSa is input from the controller 20 (becomes Hi), the drive unit 14a synchronizes with the dot clock DC and causes the display region 12a to carry out the display based on the source data SDa. When the display for the one horizontal line is completed in the display region 12a, the drive unit 14a outputs the return signal SRa to the controller 20. The controller 20 outputs the source start signal SSb to the drive unit 14b at the timing of the return signal SRa. When the source start signal SSb is input, the drive unit 14b synchronizes with the dot clock signal DC and makes the display region 12b carry out the display based on the source data SDb. When the display for the one horizontal line in the display region 12b is completed, the drive unit 14b outputs the return signal SRb to the controller 20. The controller 20 outputs the source start signal SSc to the drive unit 14c at the timing of the return signal SRb. The drive unit 14c synchronizes with the dot clock signal DC and makes the display region 12c carry out the display based on the source data SDc.

Figure 23:
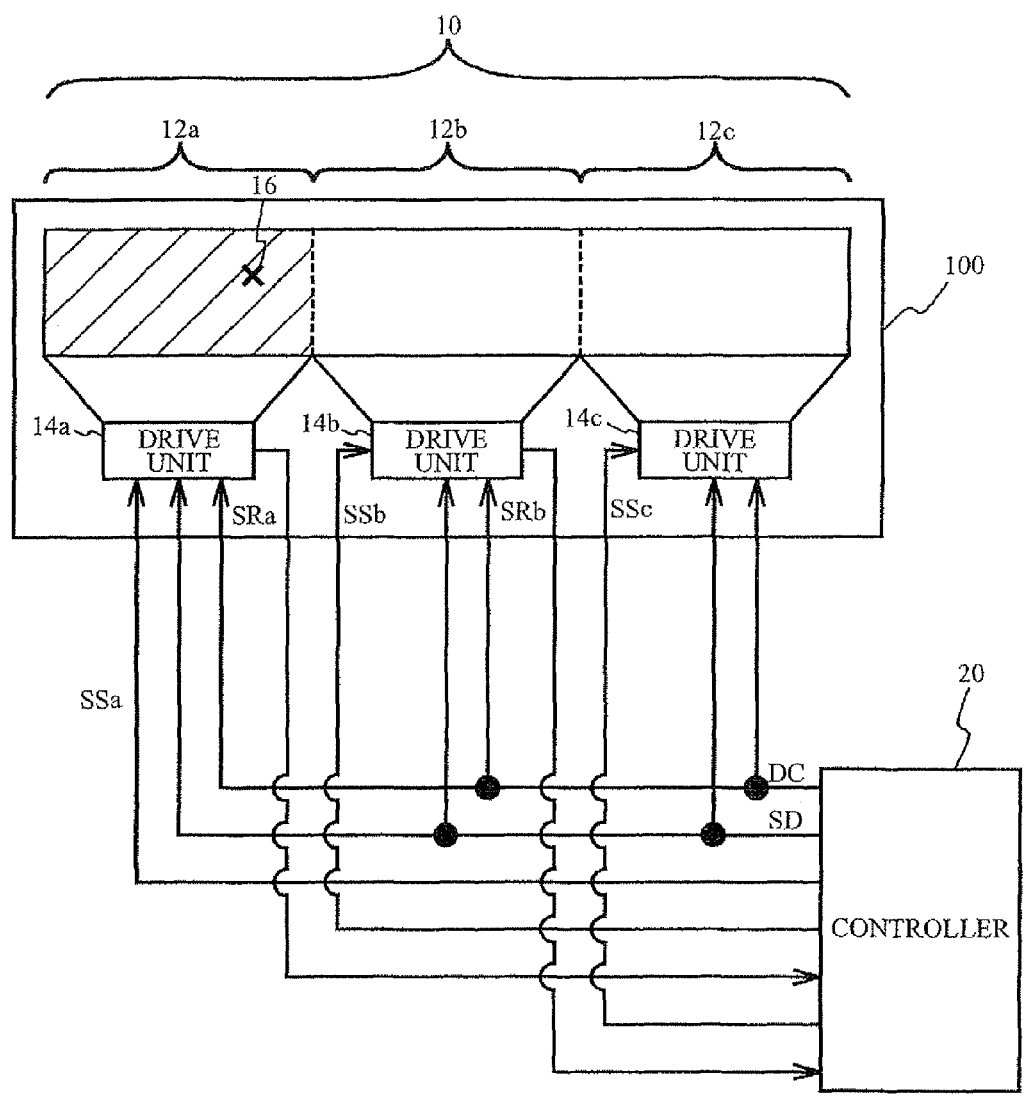
FIG. 23 is a block diagram of a vicinity of the display panel when a failure occurs in a display region.
Figure 24:
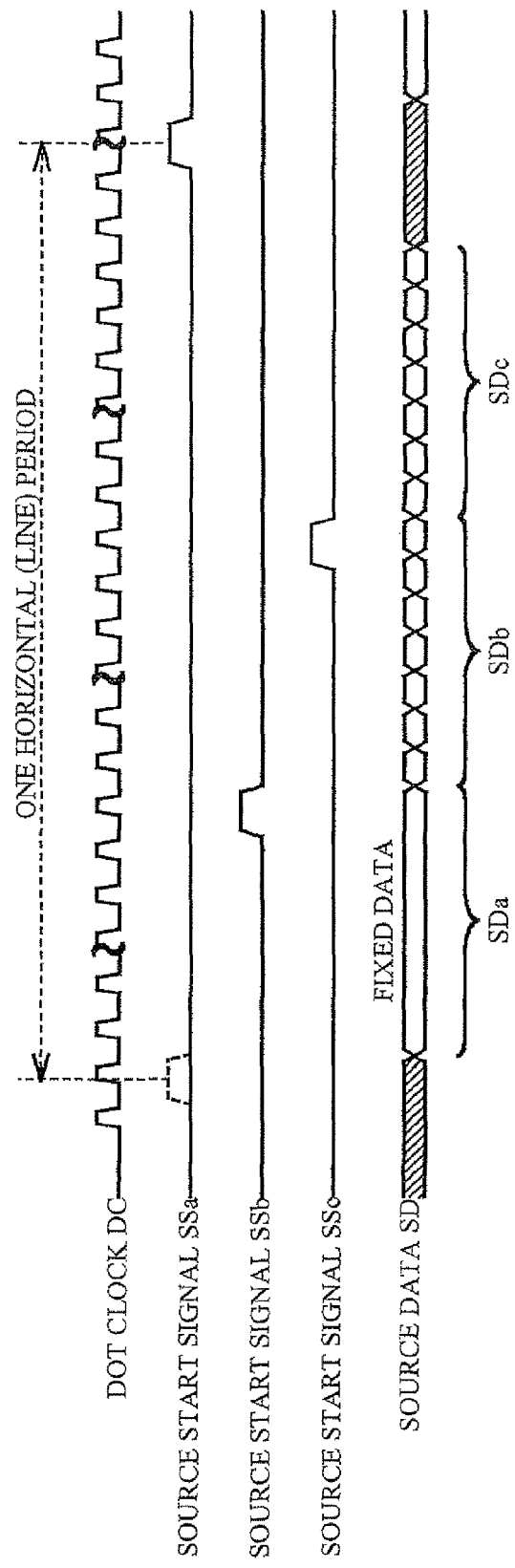
FIG. 24 is a timing chart of a dot clock, a source start signal and source data when a failure occurs in a display region in the third embodiment.

FIG. 23 illustrates a state where the failure occurs in the display region 12a. FIG. 24 is a diagram illustrating timings of the dot clock signal DC, source start signals SSa through SSc, and the source data SD when the failure occurs in the display region 12a. When the controller 20 detects the failure in the display region 12a, it does not output the source start signal SSa to the drive unit 14a (remains low state). In addition, the controller 20 outputs the fixed data as the source data SDa corresponding to the display region 12a. According to this, a single color such as black and white is displayed in the display region 12a. That is to say, the unicolor image display means of the controller 20 executes the control of displaying the unicolor image to the region other than the display region of the abnormality-time display image.

The controller 20 generates the source start signals SSb and SSc at a given timing, and outputs them to drive units 14b and 14c. The controller 20 executes the control described in the first or second embodiment by handling display regions 12b and 12c as the displayable region, and outputs source data SDb and SDc to the drive units 14b and 14c. According to the above, the image is not displayed in the display region 12a, and the image can be displayed in display regions 12b and 12c.

As described in the third embodiment, when the controller 20 detects the failure in one display region 12a of display regions 12a through 12c, it controls images displayed in display regions 12b and 12c other than the display region 12a where the failure occurred. As described, the controller 20 executes the control of the image more easily by carrying out the detection of the abnormality such as the failure of the display panel 10 in each of drive units 14a through 14c, and detecting the displayable region with respect to each of the drive units 14a through 14b.

In addition, the controller 20 generates source start signals SSa through SSc which are trigger signals to cause drive units 14a through 14c to start the operation. According to this, even though the failure occurs in one of display regions 12a through 12c, the image is displayed in each of display regions 12a through 12c independently. When the display regions 12a and 12b are normal, the drive units 14a and 14b generate source start signals SSb and SSc, and when the failure occurs in the display regions 12*a* and 12*b*, the controller 20 generates them based on the clock inside the controller 20. In addition, the controller 20 may generate source start signals SSb and SSc regardless of the normality and abnormality of display regions 12*a* and 12*b*.

A description was given by using the in-car display device as the example in first through third embodiments, but the display device may be a display device for other use such as the display device for home use.

Some preferred embodiments of the present invention have been described in detail, but the present invention is not limited to these specifically described embodiments but may have various variations and alterations within the scope of the claimed invention.

The invention claimed is:

1. A display device comprising:
    a display panel on which images are displayed and which includes a plurality of display regions;
    a plurality of driving units that display the images in the plurality of display regions;
    a displayable region detecting unit that detects at least one of displayable regions at a time of abnormality of the display panel;
    an abnormality-time display image generating unit that generates an abnormality-time display image according to the at least one of displayable regions detected by the displayable region detecting unit; and
    an abnormality-time display control unit that displays the abnormality-time display image generated by the abnormality-time display image generating unit in the displayable region while causing a driving unit of the plurality of driving units of which a corresponding display region is the displayable region to display an image in the corresponding display region,
    wherein a normal-time image displayed at a normal time is formed from a plurality of image elements, and
    wherein the abnormality-time display image generating unit reduces at least one of the plurality of image elements so that a first ratio of reduction of a first image element is smaller than a second ratio of reduction of a second image element having a priority lower than that of the first image element.

2. The display device according to claim 1, wherein the abnormality-time display image generating unit generates a reduced image generated by reducing a normal-time image displayed at a normal time to a size according to the displayable region as the abnormality-time display image.

3. The display device according to claim 1, wherein the abnormality-time display image generating unit generates a clipped image generated by clipping a normal-time image displayed at a normal time according to the displayable region.

4. The display device according to claim 1, wherein:
    the abnormality-time display image generating unit forms processed image elements according to the displayable region based on the image elements as the abnormality-time display image, and
    the abnormality-time display control unit displays the processed image elements in the displayable region by switching them sequentially.

5. The display device according to claim 1, wherein the abnormality-time display image generating unit generates a substitution image corresponding to an image displayed at a normal time as an abnormality-time display image.

6. The display device according to claim 1, wherein when a plurality of displayable regions are detected, the abnormality-time display image generating unit generates an abnormality-time display image according to a displayable region of which an area is larger as an abnormality-time display image, and
    the abnormality-time display control unit displays the abnormality-time display image in the displayable region of which the area is larger.

7. The display device according to claim 1, wherein the display panel includes a touch panel, and
    the abnormality-time display image generating unit forms an operation unit deletion image made by deleting an image for touch panel operation included in a normal time image displayed at a normal-time as an abnormality-time display image.

8. The display device according to claim 1, further comprising a unicolor image display unit that executes a control to display a unicolor image in a region other than a display region of the abnormality-time display image.

9. The display device according to claim 1, wherein the abnormality-time display image generating unit displays the first image element at a first displayable region and displays the second image element at a second displayable region having a smaller area than that of the first displayable region.

10. A display control device that executes a display control of a display panel on which images are displayed and which includes a plurality of display regions, the control device comprising:
    a displayable region detecting unit that detects at least one of displayable regions at a time of abnormality of the display panel;
    an abnormality-time display image generating unit that generates an abnormality-time display image according to the at least one of displayable regions detected by the displayable region detecting unit; and
    an abnormality-time display control unit that displays the abnormality-time display image generated by the abnormality-time display image generating unit in the displayable region while causing a driving unit of a plurality of driving units which displays the images in the plurality of display regions of which a corresponding display region is the displayable region to display an image in the corresponding display region,
    wherein a normal-time image displayed at a normal time is formed from a plurality of image elements, and
    wherein the abnormality-time display image generating unit reduces at least one of the plurality of image elements so that a first ratio of reduction of a first image element is smaller than a second ratio of reduction of a second image element having a priority lower than that of the first image element.

* * * * *